(12) United States Patent
Badr et al.

(10) Patent No.: US 10,075,026 B2
(45) Date of Patent: Sep. 11, 2018

(54) WIRELESS POWER TRANSFER FOR DEVICES WITH VARIABLE ORIENTATION

(71) Applicant: UVic Industry Partnerships Inc., Victoria (CA)

(72) Inventors: Basem M. Badr, Victoria (CA); Nikolai Dechev, Victoria (CA); Kerry R. Delaney, Victoria (CA); Robert Somogyi-Csizmazia, Victoria (CA)

(73) Assignee: UVic Industry Partnerships Inc. (CA)

( * ) Notice: Subject to any disclaimer, the term of this patent is extended or adjusted under 35 U.S.C. 154(b) by 279 days.

(21) Appl. No.: 14/978,961

(22) Filed: Dec. 22, 2015

(65) Prior Publication Data

US 2016/0181826 A1    Jun. 23, 2016

Related U.S. Application Data

(60) Provisional application No. 62/191,187, filed on Jul. 10, 2015, provisional application No. 62/096,386, filed on Dec. 23, 2014.

(51) Int. Cl.
*H01F 27/42* (2006.01)
*H02J 50/70* (2016.01)
*H02J 50/12* (2016.01)

(52) U.S. Cl.
CPC ............. *H02J 50/70* (2016.02); *H02J 50/12* (2016.02)

(58) Field of Classification Search
CPC .................................. H02J 50/70; H02J 50/12
USPC ........... 307/104; 343/788; 342/450; 600/372
See application file for complete search history.

(56) References Cited

U.S. PATENT DOCUMENTS

| | | | | |
|---|---|---|---|---|
| 2007/0023422 A1* | 2/2007 | Obata | ............... | H05B 6/105 219/633 |
| 2007/0296393 A1* | 12/2007 | Malpas | ............... | A61B 5/0002 323/355 |
| 2009/0085807 A1* | 4/2009 | Anderson | ............... | G01B 7/003 342/450 |

OTHER PUBLICATIONS

Budgett et al., "Novel technology for the provision of power to implantable physiological devices," *Journal of Applied Physiology*, 102(4): 1658-1663, Jan. 11, 2007.
Carta et al., "A wireless power supply system for robotic capsular endoscopes," *Sensors and Actuators A: Physical*, 162(2): 177-183, Jan. 4, 2010.
Cong et al., "A Wireless and Batteryless 10-Bit Implantable Blood Pressure Sensing Microsystem With Adaptive RF Powering for Real-Time Laboratory Mice Monitoring," *IEEE Journal of Solid-State Circuits*, 44(12): 3631-3645, Dec. 2009.
Dissanayake et al., "Experimental Study of TET System for Implantable Biomedical Devices," *IEEE Transactions on Biomedical Circuits and Systems*, 3(6): 370-379, Dec. 2009.
(Continued)

*Primary Examiner* — Thomas Skibinski
(74) *Attorney, Agent, or Firm* — Klarquist Sparkman, LLP

(57) ABSTRACT

Disclosed herein are embodiments of a novel WPT system to deliver power from a stationary source (e.g., a primary coil) to a moving telemetric device (e.g., a secondary coil) via magnetic resonance coupling. Novel configurations of the secondary employing ferrite components placed at specific locations and orientations within the coil. Embodiments of these secondary coil configurations are constructed and their performance is tested. Measurements show that ferrite components improved power transfer at most orientations, beyond that of the nominal ferrite-less configuration. The use of angled ferrite components further improved power transfer.

20 Claims, 14 Drawing Sheets

(56) References Cited

OTHER PUBLICATIONS

Harrison, "Designing Efficient Inductive Power Links for Implantable Devices," *2007 IEEE International Symposium on Circuits and Systems*, 4 pages, May 2007.

Hsu et al., "Power Flow Control of a 3-D Wireless Power Pick-up," *2nd IEEE Conference on Industrial Electronics and Applications*, 2172-2177, May 2007.

Jow et al., "Geometrical Design of a Scalable Overlapping Planar Spiral Coil Array to Generate a Homogeneous Magnetic Field," *IEEE Transactions of Magnetics*, 49(6): 2933-2945, Jun. 2013.

Kilinc et al., "A System for Wireless Power Transfer of Micro-System In-Vivo Implantable in Freely Moving Animals," *IEEE Sensors Journal*, 14(2): 522-532, Feb. 2014.

Kumar et al., "Resonance-based Wireless Power Delivery for Implantable Devices," *2009 IEEE Biomedical Circuits and Systems Conference*, pp. 25-28, Nov. 2009.

Laskovski et al., "Wireless Power Technology for Biomedical Implants," Chapter 7 of *Biomedical Engineering*, pp. 119-132, Oct. 1, 2009.

Lee et al., "An Inductively Powered Scalable 32-Channel Wireless Neural Recording System-on-a-Chip for Neuroscience Applications," *IEEE Transactions on Biomedical Circuits and Systems*, 4(6): 360-372, Dec. 2010.

McCormick et al., "Powering Implantable Telemetry Devices from Localized Magnetic Fields," *Proceedings of the 29th Annual International Conference of the IEEE EMBS*, 2331-2335, Aug. 2007.

Pinuela et al., "Maximising DC to Load Efficiency for Inductive Power Transfer," *IEEE Transactions on Power Electronics*, 28(5): 2437-2447, May 2013.

RamRakhyani et al., "Design and Optimization of Resonance-Based Efficient Wireless Power Delivery Systems for Biomedical Implants," *IEEE Transactions of Biomedical Circuits and Systems*, 5(1): 48-63, Feb. 2011.

Russell et al., "Wireless power delivery system for mouse telemeter," *2009 IEEE Biomedical Circuits and Systems Conference*, pp. 273-276, Nov. 2009.

Soltani et al., "Cellular Inductive Powering System for Weakly-Linked Resonant Rodent Implants," *2013 IEEE Biomedical Circuits and Systems Conference*, pp. 350-353, Oct. 31-Nov. 2, 2013.

Wentz et al., "A wirelessly powered and controlled device for optical neural control of freely-behaving animals," *Journal of Neural Engineering*, 8(4): 10 pages, Jun. 23, 2011.

Xu et al., "A Novel Mat-Based System for Position-Varying Wireless Power Transfer to Biomedical Implants," *IEEE Transactions on Magnetics*, 49(8): 4774-4780, Aug. 2013.

Xu et al., "Batteries Not Included," *IEEE Microwave Magazine*, pp. 63-72, Mar. 6, 2013.

\* cited by examiner

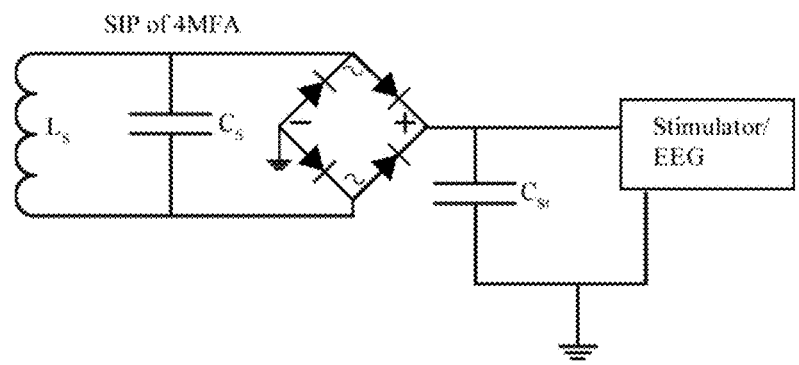
FIG. 17
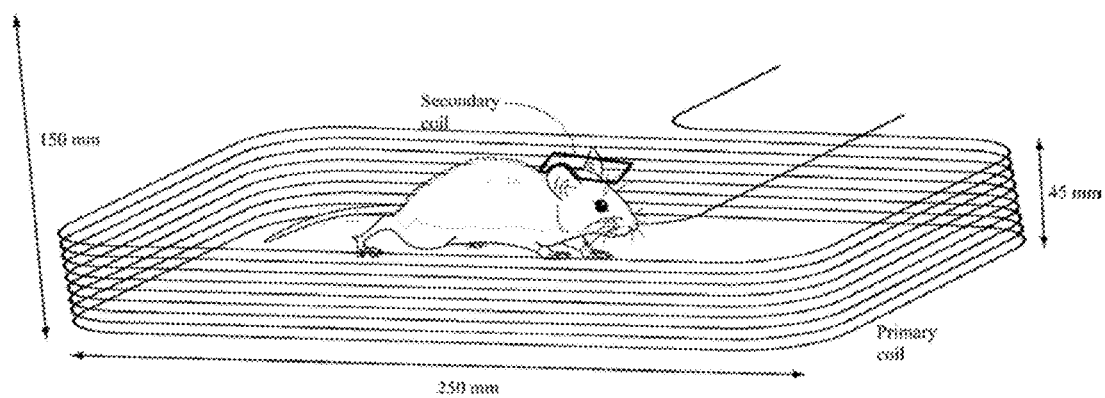
FIG. 18
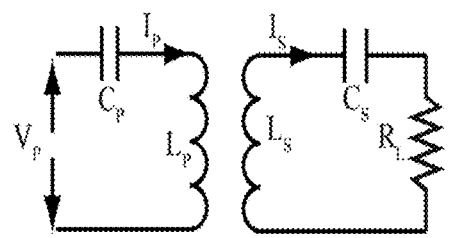 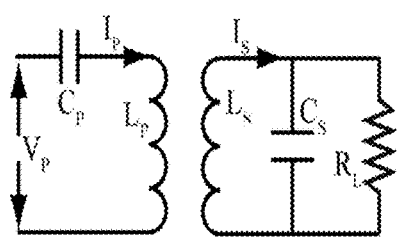
FIG. 19A          FIG. 19B

WIRELESS POWER TRANSFER FOR DEVICES WITH VARIABLE ORIENTATION

CROSS REFERENCE TO RELATED APPLICATION

This application claims the benefit of U.S. Provisional Patent Application Nos. 62/096,386, filed on Dec. 23, 2014, and 62/191,187, filed on Jul. 10, 2015, each of which is incorporated herein by reference in its entirety.

FIELD

The present disclosure concerns embodiments of wireless power transfer for telemetric devices with variable orientation.

BACKGROUND

In recent years, implantable biomedical telemetry devices (implants) have gained much attention for a variety of applications including generating stimulus signals, monitoring the body, and communicating internal vital signs to the outer world. Providing power to these implants is one of the major challenges in designing such systems. Power requirements for implants vary with the application and can range from a few milliwatts to dozens of milliwatts or more. Some implants are battery operated and their application is limited due to the device size, weight, and battery longevity. For applications involving mice, battery size and weight is more problematic for long duration experiments (1 or more days). In some cases, implants use rechargeable batteries, where those systems employ wireless recharging.

A vast majority of the research on neural mechanisms of therapies is currently conducted using rodent models. Implantable biotelemetry systems are effective tools for clinical medicine and also in animal research, because they allow for the acquisition of otherwise unavailable physiological data, such as high quality internal electromyographic (EMG) data, electroencephalogy (EEG) data, motion data, or other data. High-quality data means may sample points per-unit-time, for a high fidelity waveform. For example, an EEG signal is considered acceptable quality with 200 samples/second at minimum, but ideally 2000 samples/second or higher. Gathering high quality behavioral and biological data from small rodents is important for the study of various disease models in biomedical research. Acquisition of high quality data requires reasonable power, for the electronics to sample at such rates, digitize the data, and then transmit it by radio signal. Presently, the largest permissible size/weight battery acceptable for mice would lose power in about 30 minutes if it had to acquire and transmit data at 200 samples/sec. The only way to perform high quality data sampling and transmission for continuous periods of several hours or longer, is with a wireless power scheme. In addition, to conduct research with rodents effectively, they must be able to move freely inside their cage. However, the continuously changing orientation of the rodent leads to coupling loss/problems between the primary (transmitter) and secondary (receiver) coils, presenting a major challenge. Thus, a need exists in the art for devices and systems capable of wireless power transmission for powering the performance requirements for telemetric devices for animal monitoring.

SUMMARY

Disclosed herein are embodiments of wireless power transfer (WPT) systems that can be used to continuously power telemetric devices. The disclosed systems can provide power to the devices for indefinite periods, thereby supplying sufficient power for high quality data collection and transmission for experiments requiring durations of a few hours to a few weeks or more. Such systems thereby obviate the risks associated with surgery typically used to replace batteries, or the risks of transcutaneous wiring.

Disclosed herein are embodiments of devices, comprising a coil defining a coil axis, at least one ferrite rod having a rod axis and situated to be at least partially within a volume defined by the coil, and a receiving component, such as a rectifier, coupled to the coil so as to receive an electrical voltage induced in the coil. In some embodiments, the device comprises a tank capacitor. The coil can also be referred to herein as a secondary coil or receive-coil when used in combination with a primary coil. The at least one ferrite rod can comprise four ferrite rods. The rod axis of the at least one ferrite rod can be at an angle of about 0° to about 85° relative to the axis of the coil. In some embodiments, the rod axis of the at least one ferrite rod is at an angle of 45°. Some embodiments can comprise more than one ferrite rod and in such embodiments, the ferrite rods can have similar angles with respect to the axis of the secondary coil. In some embodiments with more than one ferrite rod, the ferrite rods can have angles that are mirror images with respect to each other (or that form a regular pattern with respect to each other), at specific angles with respect to the axis of the secondary coil. In some embodiments, the at least one ferrite rod is situated proximal to the secondary coil. In some embodiments, the receiving component can receive the electrical voltage induced in the coil and transmit the electrical voltage to a stimulator component, such as electrodes coupled to a subject to be stimulated. In some embodiments, the receiving component can receive the electrical voltage induced in the coil and transmit the electrical voltage so as to produce an electrical stimulus in a subject. In other embodiments, the receiving component receives the electrical voltage induced in the coil and transmits the electrical voltage to a microprocessor.

Some device embodiments can further comprise a rectifier coupled to the combination of the secondary coil and a tank capacitor, so as to rectify the electrical voltage induced in the secondary coil. The rectifier can be a full wave bridge rectifier. In some embodiments, a smoothing capacitor is coupled to the rectifier so as to receive the rectified voltage from the rectifier. In some embodiments, the devices can further comprise a circuit substrate and the coil is secured to the circuit substrate. The coil can be positioned around the perimeter of the circuit substrate. The at least one ferrite rod can be situated so as to extend through the circuit substrate. The ferrite rod can be situated so as to be substantially bisected along a rod axis by the circuit substrate. The coil can have a circular, oval, elliptical, rectangular, regular or irregular polygonal shape. In some embodiments, the ferrite rod has a circular, oval, elliptical, rectangular, regular or irregular polygonal cross section.

The disclosed systems can be used to power a telemetry implant device, such as a rodent implant device (or "RID"), which can act as a stimulator and sensor for a freely moving small animal, such as a rodent. Particular embodiments of the devices disclosed herein are suitable for subcutaneous implantation in a rat, subcutaneous implantation in a mouse, subcutaneous implantation into small animals, and other embodiments are suitable as a head-mounted device for small animals.

Also disclosed herein are embodiments of a system, comprising a primary coil defining a primary coil axis and a primary tank capacitor coupled to the primary coil. Also included is a secondary component that includes the secondary coil defining a secondary coil axis, a secondary tank capacitor, at least one ferrite rod having a rod axis and situated to be at least partially within a volume defined by the secondary coil, and a receiving component coupled to the secondary coil so as to receive an electrical voltage induced in the secondary coil by the primary coil. The system also can include an amplifier component, a power supply, a signal generator, or any combination thereof. In some embodiments, the amplifier component is coupled to a power supply, which in turn is coupled to a signal generator. The at least one ferrite rod can comprise four ferrite rods. The rod axis of the at least one ferrite rod can be at an angle of about 0° to about 85° relative to the axis of the secondary coil. In some embodiments, the rod axis of the at least one ferrite rod is at an angle of 45°. Some embodiments can comprise more than one ferrite rod and in such embodiments, the ferrite rods can have similar angles with respect to the axis of the coil. In some embodiments with more than one ferrite rod, the ferrite rods can have angles that are mirror images with respect to each other (or angles that form a regular pattern with respect to each other), at specific angles with respect to the axis of the secondary coil. In some embodiments, the at least one ferrite rod is situated proximal to the secondary coil. The receiving component can receive the electrical voltage induced in the secondary coil by the primary coil and can either transmit the electrical voltage to a stimulator component (e.g., electrodes coupled to a subject to be stimulated) or transmit the electrical voltage so as to produce an electrical stimulus in a subject. In other embodiments, the receiving component receives the electrical voltage induced in the secondary coil by the primary coil and transmits the electrical voltage to a microprocessor.

Some system embodiments can further comprise a rectifier coupled to the combination of the secondary coil and tank capacitor so as to rectify the electrical voltage induced in the secondary coil. The rectifier can be a full wave bridge rectifier, a half-bridge rectifier, or any other suitable rectifier. In some embodiments, such devices further comprise a smoothing capacitor coupled to the rectifier so as to receive the rectified voltage from the rectifier. In some embodiments, the devices can further comprise a circuit substrate and the secondary coil is secured to the circuit substrate. The secondary coil can be positioned around the perimeter of the circuit substrate. The at least one ferrite rod can be situated so as to extend through the circuit substrate. In some embodiments, the ferrite rod can be situated so as to be substantially bisected along a rod axis by the circuit substrate. In some embodiments, the secondary coil has a circular, oval, elliptical, rectangular, regular or irregular polygonal shape. In some embodiments, the ferrite rod has a circular, oval, elliptical, rectangular, regular or irregular polygonal cross section.

Also disclosed herein are embodiments of a method, comprising generating an alternating electrical current in a primary coil so as to induce an alternating current in a secondary coil, the secondary coil having a secondary axis, wherein at least one ferrite rod is within a volume defined by the secondary coil; and coupling the alternating current induced in the secondary coil to a tank capacitor, coupled to a rectifier so as to produce a rectified electrical current. In some embodiments, the rectified electrical current is filtered with a smoothing capacitor.

The foregoing and other features and advantages of the present disclosure will become more apparent from the following detailed description, which proceeds with reference to the accompanying figures.

BRIEF DESCRIPTION OF THE DRAWINGS

FIG. 2A illustrates PP topology and FIG. 2B illustrates the loading effect of the secondary coil back onto the primary circuit.

FIG. 3A illustrates a spherical workspace and FIG. 3B illustrates an arrow plot on single x-z plane, showing normalized magnetic flux density.

FIG. 5A is a color plot plotted on the x-y plane within and around the primary coil; FIG. 5B is a color plot plotted within the 4MF configuration coil plane and within the ferrite rods.

FIG. 6A is an arrow plot of 4MF at 0° orientation; FIG. 6B is an arrow plot of 4MF at 30° orientation.

FIG. 7A is an arrow plot of 4MFA at 0° orientation; FIG. 7B is an arrow plot of 4MFA at 30°; FIG. 7C is an arrow plot of 4MFA at 60°; and FIG. 7D is an arrow plot of 4MFA at 90°.

FIG. 17 is a circuit diagram of an exemplary implant device.

FIG. 18 is an illustration of a representative primary coil whereby each coil winding is separated by a distance from the previous coil winding; the separation distance is 0.5 cm.

FIGS. 19A and 19B are circuit diagrams illustrating SS (FIG. 19A) and SP (FIG. 19B) topologies of obtaining magnetic resonant coupling between the primary section and the secondary section.

DETAILED DESCRIPTION

Figure 1:
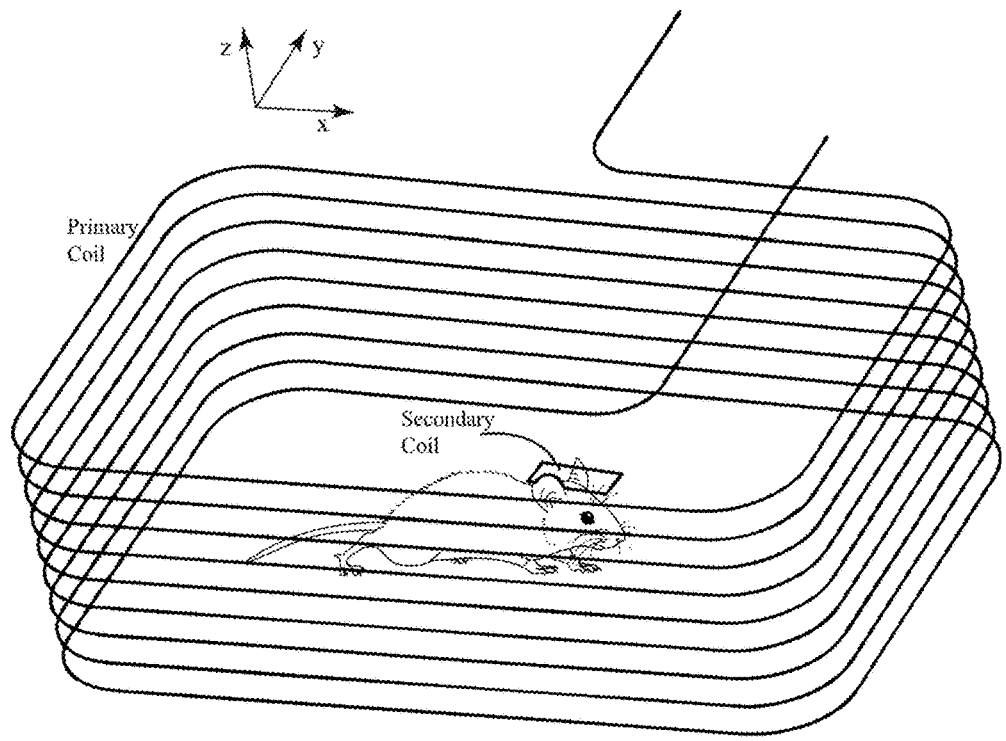
FIG. 1 illustrates an exemplary embodiment of a system for mouse-based telemetry acquisition, where a device embodiment is positioned on the head of a freely moving mouse; in this example, the mouse moves within a stationary primary coil wrapped around a small mouse housing cage sized 250×120×150 mm (length×width×height). The cage size should be selected to meet the minimum animal care standards for mice.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The present disclosure is directed toward all novel and non-obvious features and aspects of the various disclosed embodiments, alone and in various combinations and sub-combinations with one another. The disclosed systems, methods, and devices are not limited to any specific aspect or feature or combinations thereof, nor do the disclosed systems, methods, and devices require that any one or more specific advantages be present or problems be solved. Any theories of operation are to facilitate explanation, but the disclosed systems, methods, and devices are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and devices can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or devices are referred to as "lowest," "best," "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

I. Introduction and WPT Theory

Generally, electrophysiological recording and stimulation requires a dozen or more milliwatts of continuous power for the device, for periods of at least 24 hours, or preferably several weeks. The power requirement is based on biosignal acquisition quality (analog-to-digital bit depth, and sample frequency), stimulation regiments, microcontroller power, and radio transmitter power. Further, the device should be capable of harvesting power while at any orientation, such as any orientation from 0° through 90°, with respect to the cage surface plane.

One conventional technique for WPT, particularly in biomedical implants, is inductive coupling, which was first used to power an artificial heart, and now commonly used in implantable devices. More recently, it has been used for neural activity monitoring and stimulation.

WPT systems should be capable of providing power to devices for long term telemetry acquisition where significant power is used, such as for high sample rates, high data volume, or frequent stimulation regiments. A common characteristic of WPT applications for rodent telemetry acquisition is loose coupling between the primary and secondary coils, which greatly limits power transfer. Loose coupling exists when the telemetric device (receiver coil) is smaller than the primary (transmitter) coil, and where the receiver coil is at some distance away from, and orientation to, the primary coil. To compensate for loose coupling, conventional methods use resonant circuit systems to create boosted voltage/current levels at the secondary coil, even in the presence of low coupling coefficients. Such resonant power transfer, however, is dependent on factors such as the frequency match between the inherent resonant frequency of the primary coil, and the inherent resonant frequency of the secondary coil, as well as the quality factor of the secondary coil, and internal impedance of the secondary coil.

A head-mounted device for mice using resonant RF (radio frequency) WPT has been developed in the field. This device requires a secondary coil wrapped around a ferrite rod. The received energy for this device was 200 mW continuous, with 2 W bursts available when buffered with an adaptive supercapacitor circuit. The primary magnetic field strength (H/I) was 300 A/m. Another device in the field is an air-core (that is, a secondary coil with no ferrite component) WPT device designed for mice roaming on top of primary planar-spiral coils, where each coil was 100×100 mm. The resulting electromagnetic field for this device, however, was not uniform and blind-spots were reported where the secondary coil received insufficient power. A wireless implantable microsystem, also an air-core device (that is a secondary coil with no ferrite component), was developed in the field to capture blood pressure information from a freely moving laboratory mouse, with a 150×250 mm primary, and a received power of 2.5 mW. Another implantable air-core device for a freely moving mouse has been developed to monitor organic compounds, pH and temperature. With this device, a coil tracking system was used to move the primary coil, using a servo-controlled system with two rails (x-axis and y-axis) under the mouse cage. The moving primary coil was 80×80 mm, with a transfer of 1.7 mW to the secondary. Another device in the field is a WPT system consisting of an array of planar-spiral primary coils (100×100 mm) to deliver power to a planar-spiral air-core secondary coil (40×40 mm). The power transfer of this device was 21-225 mW, with a parallel orientation between coils. Another implant device has been disclosed, which also requires a wrapped ferrite secondary coil. This device delivered 20 mW to the arbitrarily oriented secondary, using a system of 24 overlapping primary coils, each of which were 100×100 mm planar-spiral coils. They were selectively switched, providing coverage anywhere over the surface area of 150×300 mm. The peak primary coil current was 4.4 A.

Yet other device embodiments that have been disclosed include the following. One air-core WPT device was used for a rat roaming on primary spiral coils on printed circuit boards. The primary coil was 308×283 mm, consisting of an overlapping (four layers) hexagonal planar-spiral coil array. The maximum power received was 33 mW when the secondary coil was at 90° with respect to the primary coil plane. Also, a model of a secondary with multiple coils (three coils perpendicular to each other wrapped on a single square ferrite core) for rats has been proposed. An air-core device has been designed for rats roaming over a charging pad (primary coil) to deliver 100 mW to a secondary coil, in a parallel orientation. The charging pad was 300×300 mm, with nine coils at resonant frequencies between 97 kHz and 209 kHz, driven by an H-Bridge inverter by a phase locked loop (PLL). Another WPT implant air-core device was used for rats roaming on several planar-spiral primary coils, each 132 mm in diameter. This WPT system used four coils, namely a driver, primary, secondary, and load coil. The secondary coil was a combo of planar-spiral and helical coil, with a 29 mm diameter. The driver and primary coils generated a nearly flat magnetic field that induces 1.3 V for neural stimulation.

Some researchers have proposed or designed a secondary with multiple coils for implantation, to achieve reasonable orientation independence from the primary coil plane. Each coil is ideally orthogonal to the others, and with similar area, or with area on the same order. The volume is 1090 mm$^3$ (air-core) and 480 mm$^3$ (ferrite core). It is 1020 mm$^3$ for air-core. In these multi-coil designs, each coil was connected with its own resonant capacitor, and its own rectifier circuit (or half wave rectifier equivalent). The main problem of a multiple-coil secondary is resonant frequency mismatch between the coils, due to component property variations (i.e., tank capacitors and inductors), and mutual inductance effects between coils.

The present disclosure concerns embodiments of devices and systems that can address some or all of the deficiencies of conventional WPT devices. The new devices and systems provide improved power transfer performance and power output for data acquisition in small animals. A rectangular-helical primary coil, as shown in FIG. 1, with an approximately uniform internal magnetic field can be used in certain embodiments disclosed herein. Further, ferrite components within the secondary coil can be used to increase the quality factor to improve the coupling at all orientations. In typical examples, a single wound secondary coil is used. This is advantageous since a single-coil winding is not plagued by frequency mismatch with other coils, or mutual inductance from other coils. Further minimal ferrite size leaves volume for on-board electronics, and has reasonable volume as compared to multi-coil designs.

Electromagnetic inductive power transfer (IPT) is a popular technique for wireless power transfer over a short range. This technique is based on two fundamental laws: Ampere's law and Faraday's law. IPT is based on the changing magnetic field that is created due to alternating currents through a primary coil that induce a voltage onto a secondary coil. The resulting magnetic field at the secondary (receiver) coil can be obtained by integrating Biot-Savart's law around the primary (transmitter) loop:

$$H = \frac{I_P}{4\pi} \oint \frac{dl \times r}{r^3} \quad (1)$$

With respect to Equation (1), $I_P$ is the current applied to the primary (transmitter) coil, and r is the transmission distance. The integration of Biot-Savart's law with respect to the line integral of the wire carrying the current ($I_P$) is:

$$H = \frac{I_P N_P a_P^2}{2\left(\sqrt{a_P^2 + r^2}\right)^3} \quad (2)$$

With respect to Equation (2), $N_P$ is the number of primary turns, and $\alpha_P$ the primary coil radius. By Faraday's law, the induced voltage ($V_{ind}$) at the secondary (receiver) coil is given by the rate of change of flux crossing the secondary coil:

$$V_{ind} = N_S \mu_0 A_S jwH \quad (3)$$

With respect to Equation (3), $N_S$ is the number of secondary turns, $A_S$ is the loop area of the secondary coil, and $\mu_0$ is the permeability of free space. Combining Equations (2) and (3), the induced voltage in the secondary coil can be expressed in terms of the primary current ($I_P$), as:

$$V_{ind} = \frac{N_P N_S \mu_0 A_S a_P^2}{2\left(\sqrt{a_P^2 + r^2}\right)^3} \cdot jwI_P \quad (4)$$

The coupling coefficient for WPT devices for rodents has been reported at around 1%, and may vary due to secondary to primary coil separation, secondary coil area with respect to primary coil area, and secondary to primary coil axial misalignment. Even if the primary coil encloses the entire volume in which the secondary is present, the coupling coefficient will suffer due to orientation misalignment of the secondary plane with respect to the primary plane. By using magnetic resonant coupling between the primary and secondary coils, coupling can be more strongly established, allowing for reasonable WPT efficiency even in the case of misalignment. The magnetic resonant technique was first proposed by Tesla.

Figure 2A:
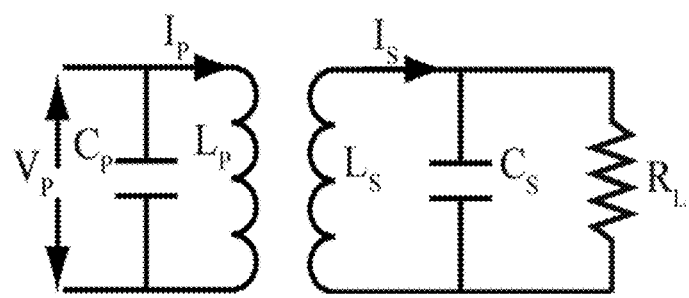
FIGS. 2A and 2B are schematics illustrating parallel-parallel (PP) resonant topology of exemplary primary and secondary coils.

There are four topologies for achieving magnetic resonant coupling between the primary and secondary coils. The topologies are SS, SP, PP, and PS, where the first S or P stands for series or parallel compensation of the primary winding, and the second S or P stands for series or parallel compensation of the secondary winding. In particular embodiments disclosed herein, the PP topology is used, such as shown in FIG. 2A. The efficiency of the PP topology is high for sub-resonant frequencies, since the power transfers at constant current, and therefore provides a larger voltage swing that aids the rectifier circuitry.

The load impedance of the secondary resonator is calculated as a lumped impedance $Z_s$ whose value depends on the secondary parallel compensation as given by:

$$Z_S = jwL_S + \cfrac{1}{jwC_S + \cfrac{1}{R}} \qquad (5)$$

Figure 2B:
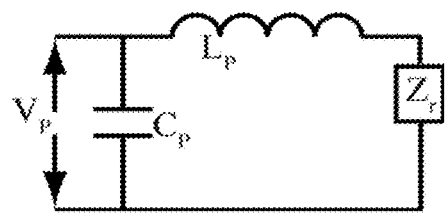

The loading effect of the secondary coil back onto the primary circuit is shown in FIG. 2B, as a reflected impedance $Z_r$. It depends on the coupling factor and operating frequency, and it can be written as:

$$Z_r = \frac{W^2 M^2}{Z_s}, \quad M = k\sqrt{L_P L_S} \qquad (6)$$

With reference to Equation (6), M is the mutual inductance between the primary and secondary coils, and k is the coupling coefficient (value between 0 and 1). Substituting equation (5) into equation (6), the reflected impedance is obtained as:

$$Z_r = \frac{W^2 M^2 R}{R^2(w^2 C_s L_s - 1)^2 + w^2 L_s^2} + j \frac{-W^3 M^2 [R^2 C_s (w^2 C_s L_s - 1) + L_s]}{R^2(w^2 C_s L_s - 1)^2 + w^2 L_s^2} \qquad (7)$$

To minimize the VA ratings of the power supply and to achieve magnetic resonant coupling, it is desirable to operate at the zero phase angle of the impedance at the resonant frequency of the load impedance. This zero phase angle of the impedance at the resonant frequency must be achieved to ensure maximum power transfer. The primary capacitance used for PP topology can be obtained by:

$$C_P = \frac{L_p - M^2/L_s}{\left(\frac{M^2 R}{L_s^2}\right)^2 + w^2\left(L_P \frac{M^2}{L_s}\right)^2} \qquad (8)$$

The maximum power received by the secondary occurs when the load is conjugately matched. At resonance, the reactive components cancel and the impedance is simply the real component, which is the resistive loss of the secondary tank. For maximum power transfer to occur, the load resistance needs to be equal to the resistive loss of the secondary tank. It is found the optimum value of load resistance ($R_L$) required for maximum power transfer is:

$$R_L = \frac{R\sqrt{1 + k^2 Q_P Q_S}}{Q_S^2} \qquad (9)$$

With reference to Equation (9), $Q_P$ and $Q_S$ are the quality factor of the primary and secondary coils, respectively. At resonance, the reactive parts in the secondary coil impedance cancel out. The transferred real power via the inductive link is defined as indicated below.

$$P_O = \frac{V_{ind}^2}{R_L} \qquad (10)$$

II. Device and System Embodiments

Disclosed herein are embodiments of a device comprising a coil having an axis, at least one ferrite component having an axis, and a receiving component coupled to the coil so as to receive power translated from the coil. In some embodiments, the device a comprises a coil having an axis, a tank capacitor, at least one ferrite component having an axis, and a receiving component coupled to the coil so as to receive power translated from the coil. In some embodiments, the device can comprise four ferrite components and the axis of the ferrite component (or components) is angled at 45° relative to the axis of the coil. In particular disclosed embodiments, the ferrite component is a ferrite rod. The receiving component receives power translated from the coil and tank capacitor combination. In some embodiments, the receiving component is a rectifier, such as a full-bridge rectifier, a half-bridge rectifier, or other suitable rectifier, a smoothing capacitor, or a combination thereof. In some embodiments, the power output from the receiving component can be used to operate a stimulator component and/or to effect an electrical stimulus in a subject. In other embodiments, this power can be used to operate a microprocessor. In particular disclosed embodiments, the receiving component output power ranges from 0 mW to 120 mW, such as 20 mW to 120 mW.

The devices may be used as an implant device, or they can be used as a head-mount device. The devices may be used to provide power to other small portable electronic devices that are in the category of loosely coupled WPT. The device also can further comprise a circuit substrate. The ferrite component can be positioned within boundaries of the circuit substrate. And, the coil can be positioned around the periphery of the circuit substrate.

Also disclosed herein are embodiments of a system, comprising a primary component and a secondary component. The primary component can comprise a primary coil defining a primary coil axis and a primary tank capacitor. The primary component also can comprise a signal generator that sends a signal to a power amplifier and a power supply that powers a power amplifier, where the power amplifier drives a primary coil. The secondary component can comprise a secondary coil having an axis, a secondary tank capacitor, at least one ferrite component having an axis, and a receiving component coupled to the coil so as to receive power translated from the coil. Also, the secondary component can further comprise a smoothing capacitor. The secondary component typically comprises four ferrite components and in some embodiments these components are angled at 45° relative to the axis of the coil. The coil can be wrapped around a circuit substrate that is modified to house ferrite components within the boundaries of the substrate and the coil.

In some embodiments, an air-core device, which is a secondary coil encircling a PCB (printed circuit board) or other substrates without ferrite rods, is used as a secondary configuration embodiment. This particular embodiment can be used as a comparative device to illustrate the superior performance of other device embodiments disclosed herein. In some embodiments, the air-core exhibits low coupling with the primary coil when the air-core coil plane is at high orientations (i.e., oriented beyond 30° relative to the primary coil x-y plane). For particular rodent telemetry applications disclosed herein, such as that illustrated in FIG. 1, the rodent moves freely within the cage. Hence, its orientation and posture are constantly changing, which results in variable coupling and hence high variability in power transfer. In some orientations, coupling achieved by conventional devices or air-core devices can be lost, resulting in system reset. To remedy these problems, embodiments are disclosed herein wherein at least one ferrite component is provided and located at specific locations within the secondary coil to boost the power transfer. The ferrite components disclosed herein can have any suitable shape for inclusion in the device. In some embodiments, the ferrite component can be square, rectangular, spherical, rod-shaped, or the like. In particular embodiments, the ferrite component is an elongated member. To show the effect of using ferrites, four configurations are disclosed, as shown in FIGS. 4A-4C and FIGS. 11A-11D. These embodiments are referred to herein as the air-core, $WFR_4$, 4MF, and 4MFA configurations. To allow for performance comparisons, the latter three configurations use the same volume of ferrite components, with the same ferrite length, and have similar coil inductance values.

A baseline of power transfer is first established with the air-core design. A variation of the air-core employing ferrite components is the 4MF (comprising four medium ferrites) configuration. 4MF is studied to investigate improvements in power transfer from the distributed addition of ferrites. Also, a conventional wrapped ferrite rod pack referred to as $WFR_4$ (comprising four ferrite rods tightly packed together, which are wrapped with a secondary coil) is examined for comparative purposes. The power transfer can be improved with the 4MF configuration, as compared to either the air-core configuration or the $WFR_4$ configuration.

Another issue addressed by the disclosed device embodiments is potential reduced coupling or loss of coupling of the 4MF, $WFR_4$, or air-core configurations at high angular orientations (where the secondary coil plane is beyond 60° with respect to the primary coil plane). At these high orientations, little magnetic flux should pass through the secondary coil plane. To overcome this problem, some device embodiments comprise tilted ferrite components comprising an axis that is angled at 45° with respect to an axis of the secondary coil. This ferrite orientation can be used to improve the capture of magnetic flux at high angular orientations of the coil, as well as reasonably good capture at low angular orientations of the coil. Such embodiments are referred to herein as the 4MFA configuration (comprising four medium angled ferrites). 4MFA can be used to increase the power transfer in comparison to 4MF at high angular orientations. In addition, the 4MFA configuration occupies less volume than 4MF.

The air-core, $WFR_4$, 4MF and 4MFA configurations can be simulated using FEA (Finite Element Analysis). The simulation results show vector plots of the magnetic flux density surrounding these configurations. Magnitude plots of the flux density passing through these configurations at various angular orientations are also disclosed herein. This data is used to determine the total flux that passes through each coil configuration, at each orientation. The FEA simulations are non-resonant models; hence, further analysis beyond calculation of total flux is not warranted. Rather, the simulations provide insight into the effect of ferrite placement and orientation, to help with design of the best configurations.

Each device embodiment disclosed herein can be evaluated by placing the device within the primary coil (FIG. 1). The device can be positioned by using fixtures with variable orientation or by coupling the device to a small animal (e.g., a mouse or rat). Performance is determined by measuring the voltage induced at the secondary, of various configurations, at various angular orientations, with various currents applied to the primary coil. Since particular embodiments employ magnetic resonant coupling between the primary and secondary sections, effects such as frequency matching, impedance matching, and quality factor, all influence the total power transfer.

III. Methods of Making and Testing Devices and Systems

A simulation using 3-D FEA software is done to determine the magnetic field distribution surrounding the various secondary configurations. In particular embodiments, COMSOL FEA software is used, where COMSOL is a commercial FEA package for finding the approximate solution of partial differential equations where the domain boundaries of a given problem are complicated. FEA is used to discretize a physical model into a mesh of elements (subdivisions) and nodes, to find the approximate solutions to the Maxwell's equations that govern the system behavior. Physical models with irregular geometric shapes and multiple materials, such as the configuration models disclosed herein, are well suited for FEA. The entire model is discretized into millions of elements, which are then combined into a set of equations describing the entire system, and these are then solved with the appropriate boundary conditions.

3D FEA can be used to understand how the primary magnetic field interacts with the ferrite components in the secondary coil when the secondary is oriented with respect to the primary field. It also can be used to correlate the total flux captured by the secondary coil to the ferrite component size, shape, and location within the secondary coil. 3D FEA also can be used to help design novel configurations of ferrite-coil combinations suitable for different applications. In some embodiments, a minimal volume of ferrite is used at specific positions within the secondary coil, to maximize the secondary performance at different orientations. In some embodiments, the size of the ferrites was selected to range from 4 mm to 8 mm long, such as 5 mm to 7 mm long, or 6 mm to 7 mm long. The diameter of the ferrites can be selected to range from 1 mm to 3 mm, such as 1.5 mm to 2.5 mm, or 1.5 mm to 2 mm. In particular disclosed embodiments, the size of the ferrites is 6.4 mm long and 1.6 mm in diameter. These ferrite sizes are suitable for the 4MFA configuration (FIG. 11D), and provide a balance between providing sufficient space for onboard PCB electronics (microprocessor, radio, smoothing capacitors, rectifier, and stimulator) while minimizing the overall device volume. The total weight of the 4MFA device configuration is 1.8 g.

Figure 3A:
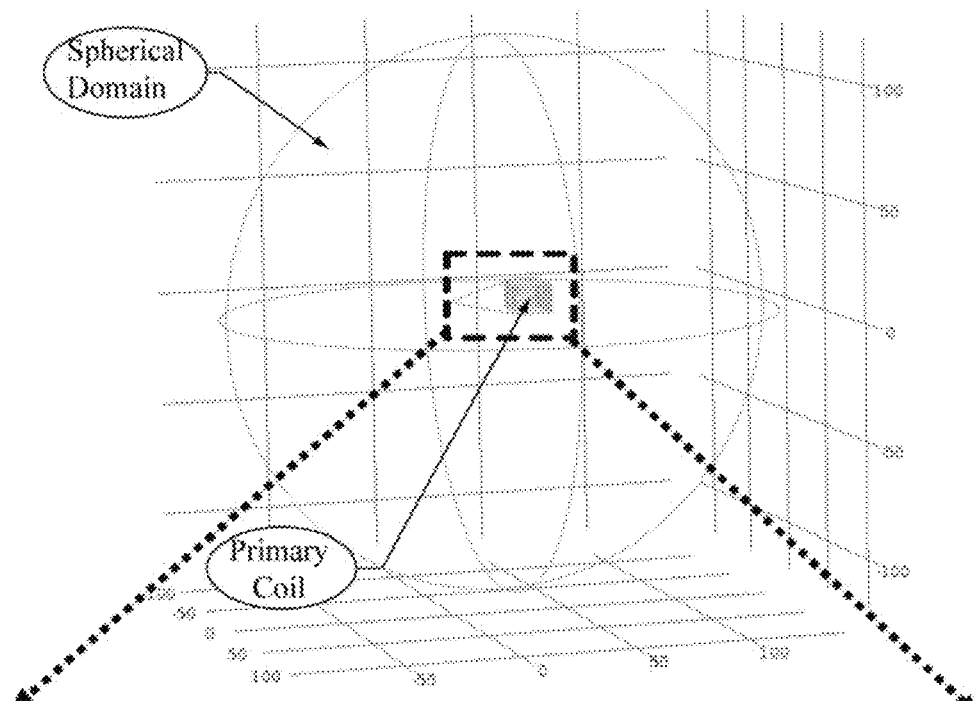
FIGS. 3A and 3B are illustrations of a WPT model in COMSOL.
Figure 3B:
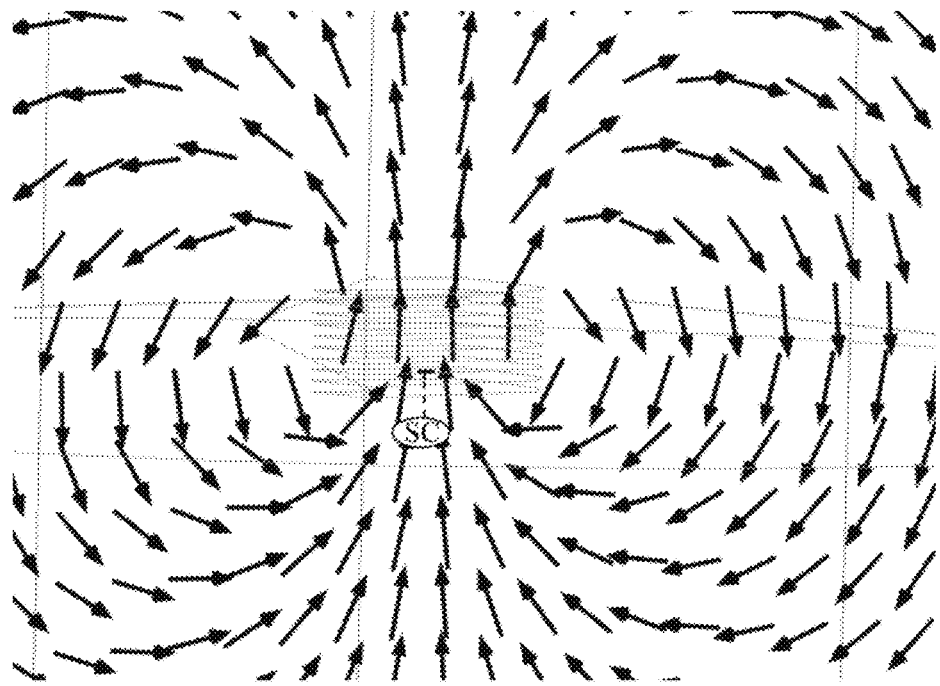

FEA simulation software has been used for plotting the magnetic flux density. The magnetic flux density distribution around (and within) various configurations can be determined. The first simulation done is for the air-core. This consists of a primary coil ($L_P$) that is 25×12×15 cm$^3$ (length×width×height) in size, together with the secondary air-core coil ($L_S$, simplified as one wire loop) that is 13.25× 20.25 mm$^2$ in size. Both coils are placed in a spherical domain of radius 120 cm with the properties of air, as shown in FIG. 3A. A Frequency Domain Study is used to investigate the WPT model at an applied frequency, corresponding to the system's resonant frequency. A simulated current of 2.5 A (peak-to-peak) is applied through the primary coil windings. The simulation output is the magnetic flux density at all points in space. A sample plot surrounding the primary coil is shown in FIG. 3B (arrow vectors are normalized, with only the x-z plane plotted for figure clarity).

Figure 4A:
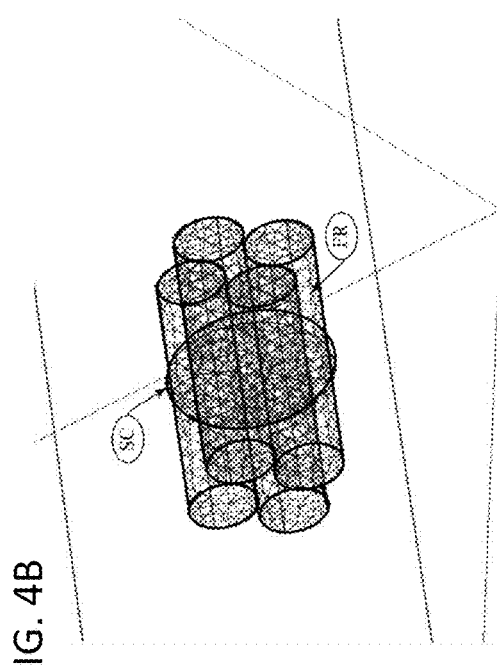
FIGS. 4A-4D are images of the finite element meshing of the secondary coil, which include: air-core (FIG. 4A), WFR$_4$ (FIG. 4B), 4MF (FIG. 4C) and 4MFA (FIG. 4D).
Figure 4B:
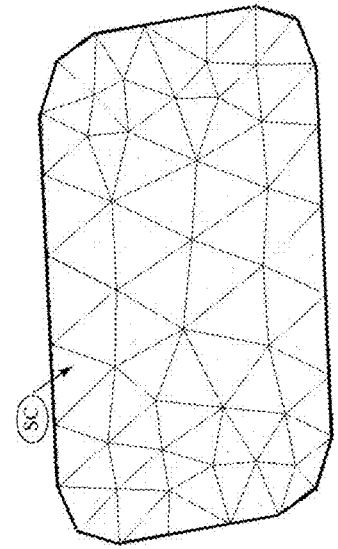
Figure 4C:
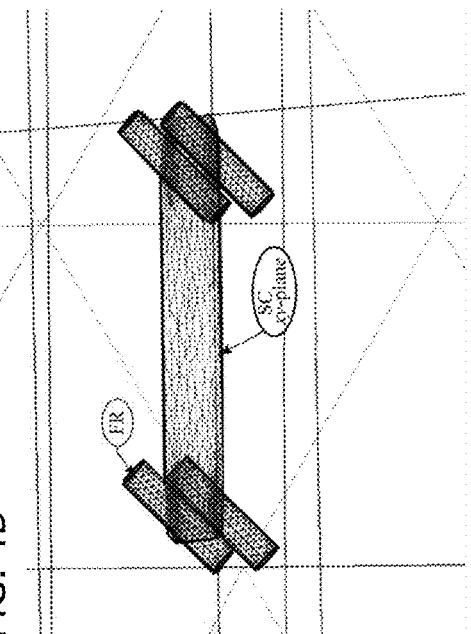
Figure 4D:
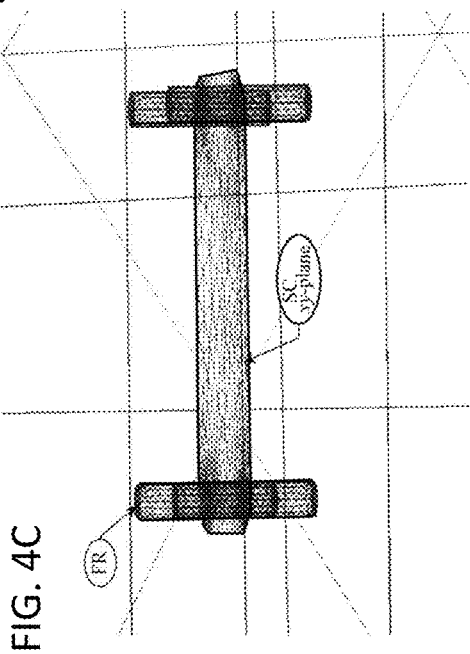

The second simulation is for the $WFR_4$ configuration. This uses the same primary coil ($L_P$), applied current, and spherical workspace, as in the previous simulation. The WFR$_4$ configuration consists of four pieces of ferrite rod (FR) bundled together as shown in FIG. 4B, where each piece is 6.4 mm in length and 1.6 mm in diameter. The secondary coil (SC) is wrapped tightly around the rods (L$_{S\text{-}WFR4}$, modeled as a simplified one wire loop). The third and fourth simulations are done for the 4MF and 4MFA configurations, respectively. These also use the same primary coil (L$_P$), applied current, and spherical workspace, as in the previous simulation. The 4MF configuration uses four pieces of ferrite (6.4 mm long and 1.6 mm diameter) placed within the corners of the air-core, as shown in FIG. 4C. The 4MFA configuration consists of the same four pieces of ferrite placed within the corners of the air-core; however, they are tilted at 45° to the secondary coil plane, as shown in FIG. 4. For both of these embodiments, the secondary coil is wrapped around the 13.25×20.25 mm$^2$ PCB (L$_{S\text{-}4MF}$ and L$_{S\text{-}4MFA}$, each modeled as a simplified one wire loop). In exemplary embodiments, the type of ferrite component used herein was 4B1, which is suitable for the operating frequency of the disclosed WPT system. Its material specifications are configured in COMSOL, including the B-H curve and permeability as a function of frequency.

Figure 5A:
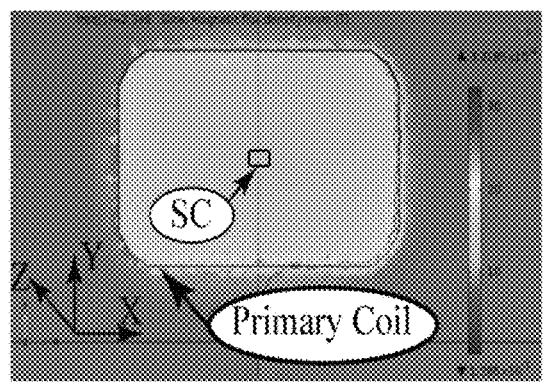
FIGS. 5A and 5B are color plots of magnetic flux density.
Figure 5B:
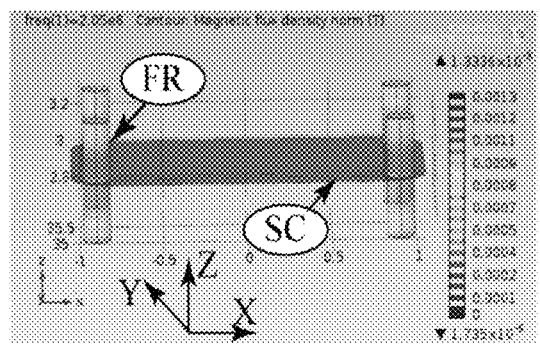

The simulation results demonstrate a significant improvement in the total flux captured when using a secondary coil configuration with ferrite components. The magnetic field is locally attracted by the ferrite, which improves the coupling between the primary and secondary coils. FIGS. 5A and 5B show an x-y plane plot of the magnetic flux density distribution produced by the primary coil, at the middle of the cage. The rectangle labeled "SC" in FIGS. 5A and 5B indicates the location used to simulate the air-core and other configurations, at the 0°, 30°, 60°, 90° orientations. The 3D FEA models developed herein cannot simulate resonant power transfer behavior, which is often needed to provide a direct estimate of power. Instead, flux densities and total flux passing through the secondary coils are obtained and disclosed.

The mutual inductance, M$_{SP}$, between the primary and secondary coils, is defined when a second coil is located such that it captures a portion of the flux generated by the primary coil as:

$$M_{SP} = \frac{\psi_{SP}}{I_P} \quad (11)$$

With reference to Equation (11), $\psi_{SP}$ is the total flux captured by the secondary coil, and I$_P$ is the current flowing through the primary coil. The total flux captured by the secondary coil ($\psi_{SP}$) is given by:

$$\psi_{SP} = \oint B_S I_P dA_S \quad (12)$$

wherein B$_S$ is the flux density crossing perpendicularly through the secondary coil, and A$_S$ is cross section of secondary coil.

Figure 6A:
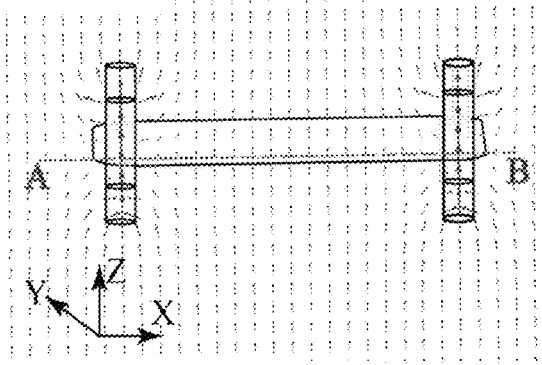
FIGS. 6A and 6B are arrow plots of the magnetic flux density passing through the 4MF configuration wherein the plots are in the x-z plane only.
Figure 6B:
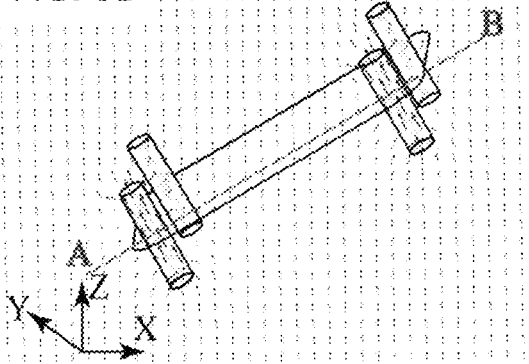
Figure 7A:
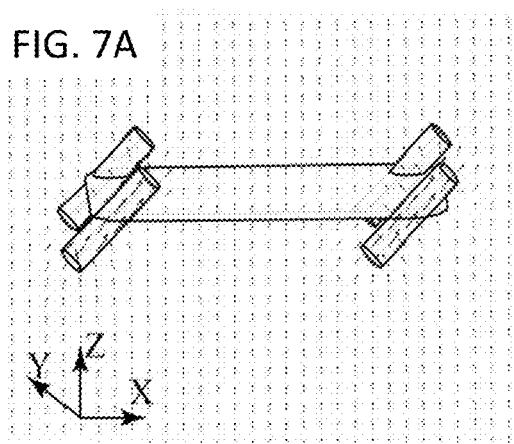
FIGS. 7A-7D are arrow plots of the magnetic flux density passing through the 4MFA configuration wherein plots are in the x-z plane only.
Figure 7B:
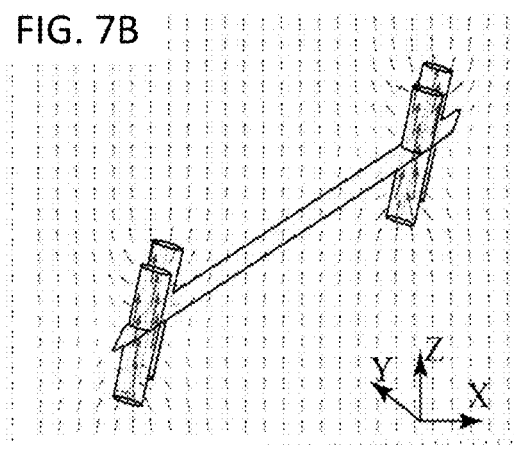
Figure 7C:
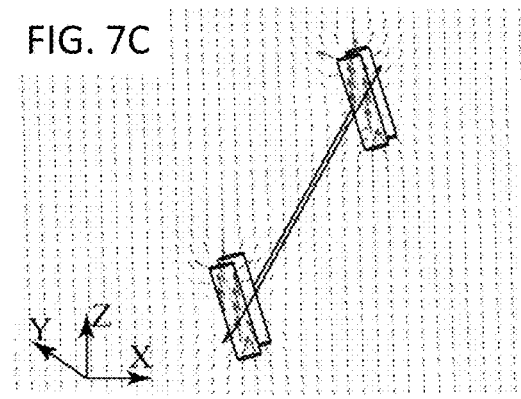
Figure 7D:
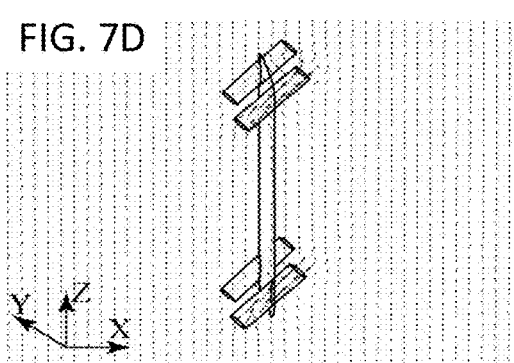

FIGS. 6A and 6B illustrate an arrow plot of the magnetic flux density, passing through the 4MF configuration. The plots are done in the x-z plane, where this particular plane intersects the axis of two ferrite components. The arrow plots are logarithmatic, and show the 4MF configuration at 0° and 30° orientations.

Figure 8A:
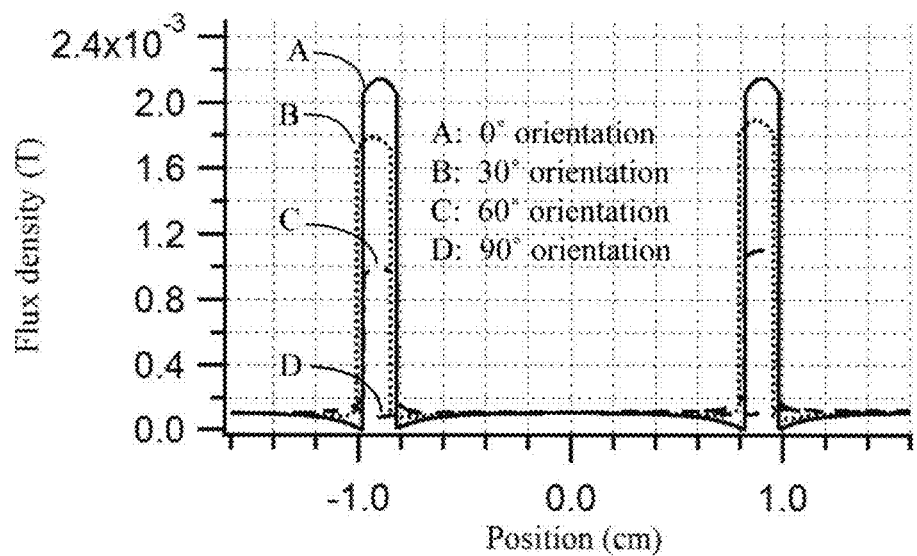
FIGS. 8A and 8B are 4MF (FIG. 8A) and 4MFA (FIG. 8B) plots of the magnetic flux density within the ferrite rods and the air space around them, where they intersect the plane corresponding to the secondary coil windings (coil x-y plane).
Figure 8B:
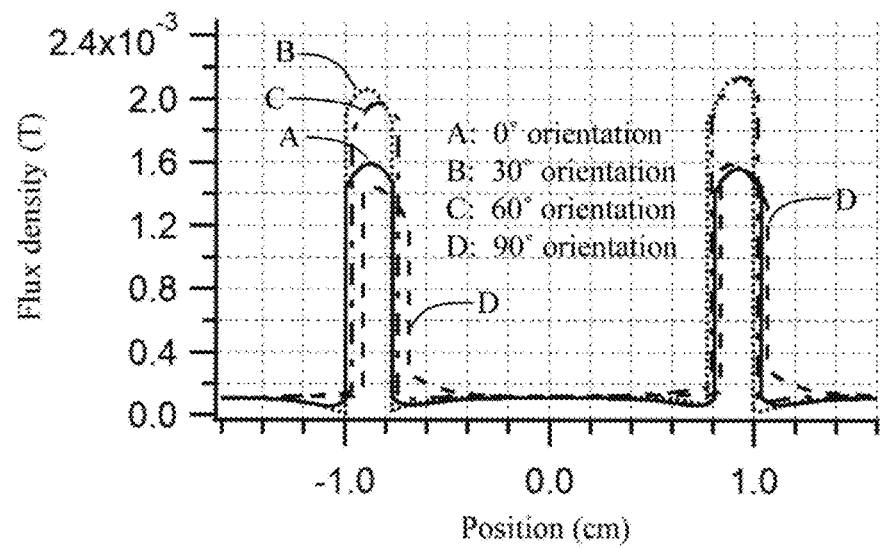

FIGS. 7A-7D illustrates an arrow plot of the magnetic flux density, passing through the 4MFA configuration at the 0°, 30°, 60°, and 90° orientations. The simulation results show that magnetic flux is pulled into the ferrite components from the surrounding space, thereby increasing the flux density inside the ferrite components. Line AB, shown in FIG. 6A, passes through two ferrites on the x-y plane. The magnitude of the flux density crossing the secondary coil, along line AB is then determined, and is plotted in the waterfall plot of FIG. 8. As seen from FIG. 8, the ambient magnetic field produced by the primary coil is approximately 1.15×10$^{-4}$ Wb/m$^2$ in locations away from the ferrites. Close to the ferrites, but not within them, the field strength drops to near zero for the 0° and 30° orientations. Without being limited to a single theory of operation, it is currently believed that this field strength drop occurs because the ferrites have consumed the surrounding field near their tips, leaving little flux around them. In this sense, there is an effective capture diameter (ECD) of flux around the tip of the ferrite, where all surrounding flux is drawn in. The ECD is related to the length, volume, shape, and material properties of the ferrite, as well as the ambient field strength. Within the ferrites, the field strength is relatively high. Using the plotted information of FIG. 8 and similar plots adjacent to the ferrites, the total flux $\psi_{SP}$ passing perpendicularly through the inside of the secondary coil x-y plane is computed, as listed in Table I.

The results of Table I begin with the nominal case for the air-core secondary (that is, the embodiment with no ferrite components), where the total flux through the coil is only a function of angular orientation. The ambient flux density through the 4MF coil and the 4MFA coil is less than the ambient flux passing through the air-core coil at the 0° orientation. Without being limited to a particular theory of operation, it is currently believed that this occurs since the ferrite ECD starves the field in its vicinity leaving less flux to pass through the air-filled portions of coil. For the case of WFR$_4$, nearly no ambient field is available for the coil, since it is all captured by the ferrites. For the case of 4MF, 4MFA and WFR$_4$, the flux density within a single ferrite component (third column of Table I) is listed. The total flux within all ferrites (fourth column of Table I) crossing normal to the coil is found by the ferrite area×number of ferrites×third column. The total flux (ambient+ferrite) of each configuration is listed in the fifth column of Table I. The 4MF simulation predicts a substantial increase in flux gathered, in comparison to the air-core configuration for the 0°, 30°, and 60° orientations. However, it is near zero at the 90° orientation. The simulation predicts that the 4MFA configuration gathers less flux at the 0° and 30° orientations in comparison to 4MF. However, 4MFA provides improvement at the 60° and 90° orientations in comparison to 4MF, because it can still draw in flux at high orientations. The case of WFR$_4$ is provided as a reference, and demonstrates that the same volume of ferrite, when tightly wrapped by a coil is far less effective than either 4MF or 4MFA, and is not effective at the 90° orientation.

TABLE I

Simulation Results Of Secondary Coil Configurations

| Configuration | Ambient Flux through Coil (Wb) × 10$^{-8}$ | Flux Density in Ferrite (Wb/m$^2$) | Total Flux in Four Ferrites (Wb) × 10$^{-8}$ | Total Flux $\psi_{SP}$ in Config (Wb) × 10$^{-8}$ |
|---|---|---|---|---|
| Air-core, 0° | 2.95 | 0 | 0 | 2.95 |
| Air-core, 30° | 2.56 | 0 | 0 | 2.56 |
| Air-core, 60° | 1.48 | 0 | 0 | 1.48 |
| Air-core, 90° | 0 | 0 | 0 | 0 |
| 4MF, 0° | 2.37 | 2.20E-03 | 1.77 | 4.14 |
| 4MF, 30° | 2.32 | 1.60E-03 | 1.29 | 3.61 |
| 4MF, 60° | 1.61 | 0.70E-03 | 0.56 | 2.17 |
| 4MF, 90° | 0 | 0 | 0 | 0 |

TABLE I-continued

Simulation Results Of Secondary Coil Configurations

| Configuration | Ambient Flux through Coil (Wb) × 10⁻⁸ | Flux Density in Ferrite (Wb/m²) | Total Flux in Four Ferrites (Wb) × 10⁻⁸ | Total Flux $\psi_{SP}$ in Config (Wb) × 10⁻⁸ |
|---|---|---|---|---|
| 4MFA, 0° | 2.55 | 1.60E-03 | 0.91 | 3.46 |
| 4MFA, 30° | 2.14 | 2.10E-03 | 1.19 | 3.33 |
| 4MFA, 60° | 1.45 | 2.10E-03 | 1.19 | 2.64 |
| 4MFA, 90° | 0 | 1.50E-03 | 0.85 | 0.85 |
| WFR₄, 0° | 0 | 1.10E-03 | 0.89 | 0.89 |
| WFR₄, 30° | 0 | 0.90E-03 | 0.72 | 0.72 |
| WFR₄, 60° | 0 | 0.50E-03 | 0.40 | 0.40 |
| WFR₄, 90° | 0 | 0 | 0 | 0 |

The four configurations can be made and tested using embodiments of the disclosed custom designed WPT system. The WPT system can be divided into two parts, namely the primary and secondary components, such as the primary and secondary sections illustrated in FIG. 9. Magnetic resonant coupling is achieved by tuning the primary section such that both sections resonate at the same frequency.

Figure 9:
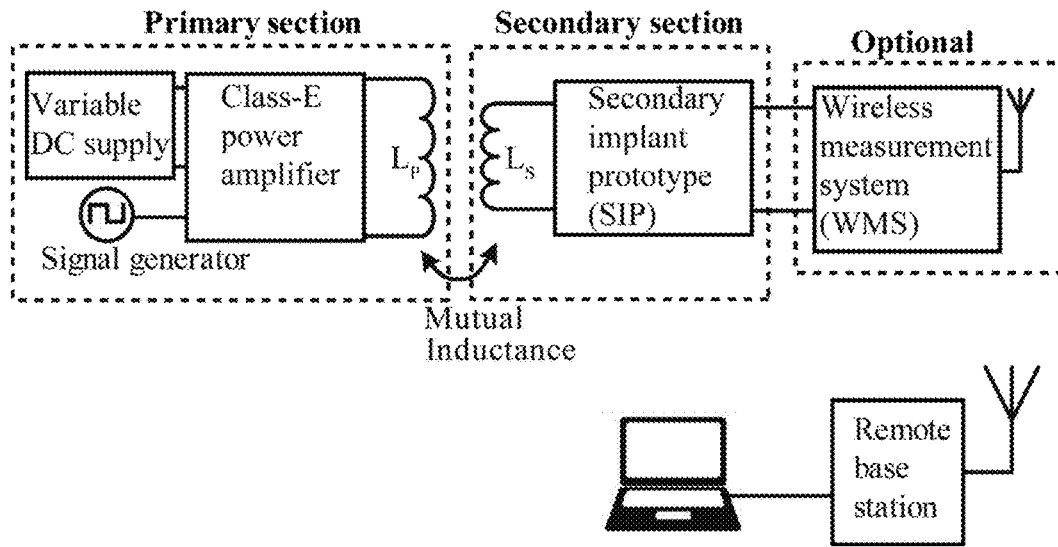
FIG. 9 is a block diagram of a proposed WPT embodiment.

With respect to the embodiment illustrated in FIG. 9, the power is supplied to the primary section using a DC power supply. A signal generator (Agilent 33250A) provides the desired frequency to a Class-E power amplifier, which is used to generate a sinusoidal current ($I_P$) in the primary coil ($L_P$), which in turn generates the electromagnetic field. This alternating field induces a sinusoidal voltage in the secondary coil ($L_S$) of the device, which is rectified into a DC voltage ($V_{ind}$) that powers the application load ($R_L$). In some embodiments, the induced DC voltage $V_{ind}$ can be measured across the load $R_L$, using a custom Wireless Measurement System (WMS). The WMS is powered by battery and communicates via radio to a remote base station connected to a laptop. The WMS wireless data transmission helps the WPT measurements, since it overcomes many problems when using corded oscilloscope probes, to measure the secondary section. In some embodiments, attempts to measure $V_{ind}$ across the load $R_L$ used an oscilloscope via coaxial cable. Some of these measurements, however, exhibited offset and noise problems.

Figure 10:
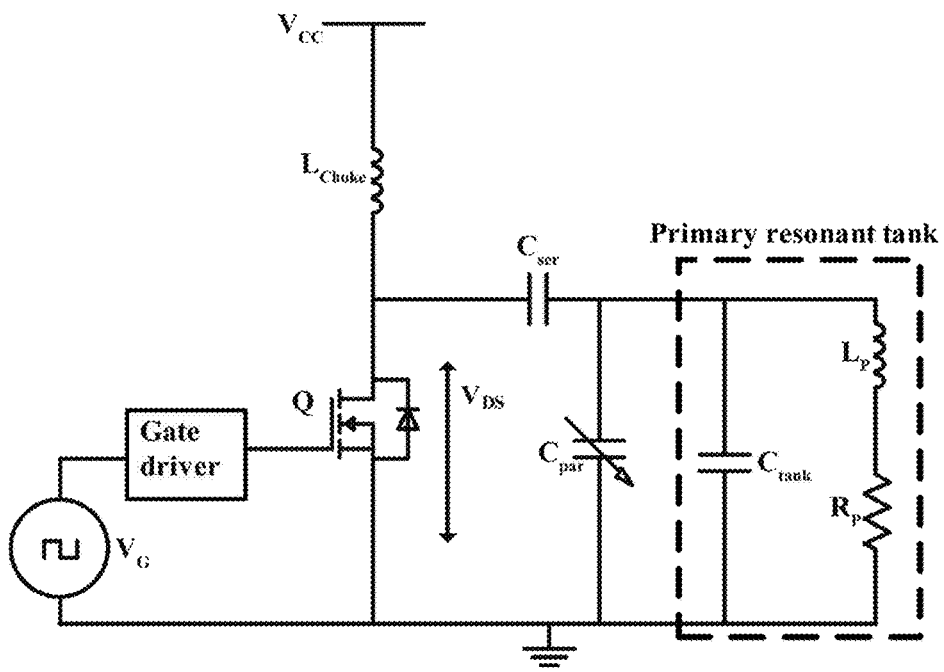
FIG. 10 is a schematic of a Class-E amplifier design with a P (parallel) resonance topology of the primary coil with the primary tank capacitor.

An exemplary Class-E amplifier design used to drive the primary coil ($L_P$) is shown in FIG. 10. The Class-E topology can reduce the stress on the switching element to a minimum. The parallel capacitance normally present in a Class-E amplifier has been replaced here by a diode where the diode allows for suboptimum operation. It also is possible to use other classes of power amplifiers to drive the primary coil.

A pulse train ($V_G$, duty cycle 0.5) is applied at the gate driver (MIC4421). The switch used is a MOSFET (STP16NK65Z), which has high power handling and nanosecond switching capabilities. The power amplifier can deliver a maximum sinusoidal current (peak-to-peak) of 7 A through the primary coil, however, only up to 2.5 A is used in embodiments disclosed herein. This creates sinusoidal voltages (peak-to-peak) of up to 2.3 kV across the primary resonant tank, shown in FIG. 10.

FIG. 11 shows the schematic diagram and cross section of the air-core, WFR₄, 4MF and 4MFA configurations. The rectifier output from each configuration is connected to the load, $R_L$. The secondary coil is wound around the perimeter of the PCB for the air-core, 4MF and 4MFA configurations. For WFR₄ the secondary coil is wrapped directly around the ferrites.

To achieve high quality factors, inductors with low effective series resistance (ESR) are required for high frequencies, due to the skin effect and proximity effect. To reduce the ESR, multistrand Litz wires are commonly used. In particular embodiments disclosed herein, the ideal frequency range of operation is 100 kHz to 4 MHz, where no biological effects have been reported. All four configurations of the secondary coil employ 48 AWG Litz wire, where the number of turns used in the air-core, 4MF and 4MFA configurations is 28 turns. The number of turns used in WFR₄ is 50 turns. In some embodiments, the device comprises a receiving component that is capable of receiving power from a primary coil through the secondary coil and can either transfer the power to produce a stimulus that affects the test subject or that transfers the power to a microprocessor that is connected to sensors that can be used to measure response from the test subject (e.g., EEG responses).

The resonant frequency of each configuration is a function of its own LC tank properties and is not adjustable. The capacitor value can depend on the operating frequency used for resonance. In some embodiments, the secondary LC tank is created by using a fixed 235 pF tank capacitor ($C_s$) for all configurations. The coil parameters (Q and $L_s$) of each configuration are listed in Table II, as measured using an HP 4285A LCR meter. The resulting resonant frequency for each configuration is listed in Table III, along with the LC tank impedance, which are measured using an HP 4193A Vector Impedance Meter.

TABLE II

Parameters of the secondary coil of Device configurations

| Configuration | Q | L (µH) |
|---|---|---|
| Air-core | 36 | 22.4 |
| WFR₄ | 51.3 | 25.7 |
| 4MF | 44 | 29.5 |
| 4MFA | 44.3 | 26.8 |

The impedance matching within the device must be designed appropriately to avoid internally reflected power loss from the secondary load $R_L$ to the secondary LC tank. The rectifier in the device exhibits impedance with a resistive and reactive part. The reactive part (capacitive component) of this load impedance can be considered as part of the tank impedance of the secondary section. Maximum power will flow when the resistive component of the load $R_L$ is conjugately matched, as explained by Equation (9). The experimental measurements make use of a conjugately matched load $R_L$ to ensure the maximum power transfer for the overall system.

TABLE III

Measured resonant frequency and the impedance magnitude of device configurations

| Configuration | $F_{res}$ (MHz) | $R_{LC}$ (kΩ) |
|---|---|---|
| Air-core | 2.302 | 10.1 |
| WFR₄ | 2.101 | 12.3 |
| 4MF | 2.057 | 12 |
| 4MFA | 2.104 | 11.5 |

Figure 12:
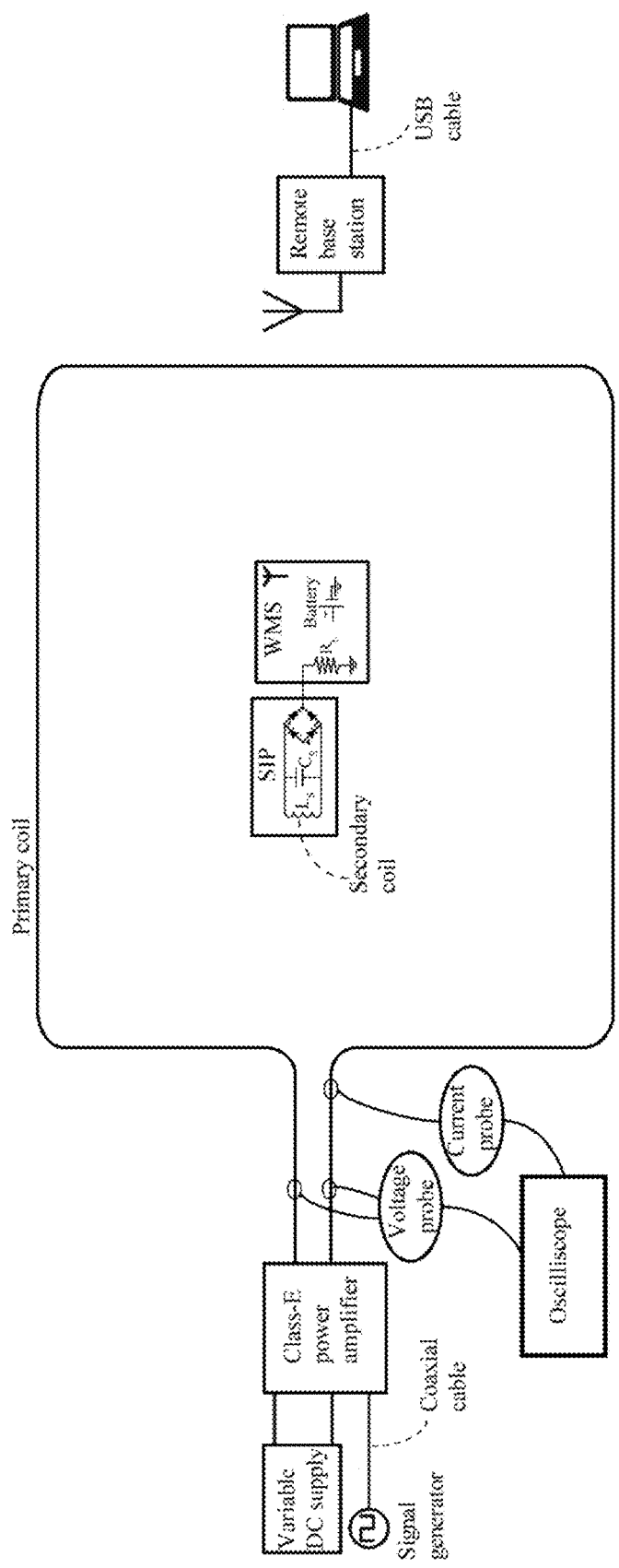
FIG. 12 shows an exemplary WPT experiment setup.

For particular WPT experiments, the primary coil can be wound around a small animal cage, such as is illustrated in FIG. 1. In some embodiments, four experimental fixtures were constructed to hold the device at various orientations (0°, 30°, 60°, and 90° with respect to the x-y plane of FIG. 1) to simulate the angular orientations of a rodent. Each fixture holds the device at a 3 cm height above the base of the cage, at the center of the cage. FIG. 12 shows an exemplary experimental setup of a WPT system embodiment. The output voltage of the Class-E power amplifier is measured by a high voltage probe and the primary current ($I_P$) is measured by a current probe (Agilent N2893A). The high voltage and current probes are connected to the oscilloscope, as shown in FIG. 12. Prior to each WPT experiment, a calibration procedure is done to ensure resonant coupling between the primary and secondary.

Particular embodiments using the four exemplary configurations disclosed herein were conducted to measure the power transfer between the primary and secondary sections. In some embodiments, two independent parameters were varied: the device orientation (0°, 30°, 60°, and 90° with respect to the x-y plane), and the current ($I_p$) applied to the primary coil (1, 1.5, 2 and 2.5 A peak-to-peak sinusoidal). The resulting voltage induced $V_{ind}$, in the secondary device was measured by the WMS.

Figure 13:
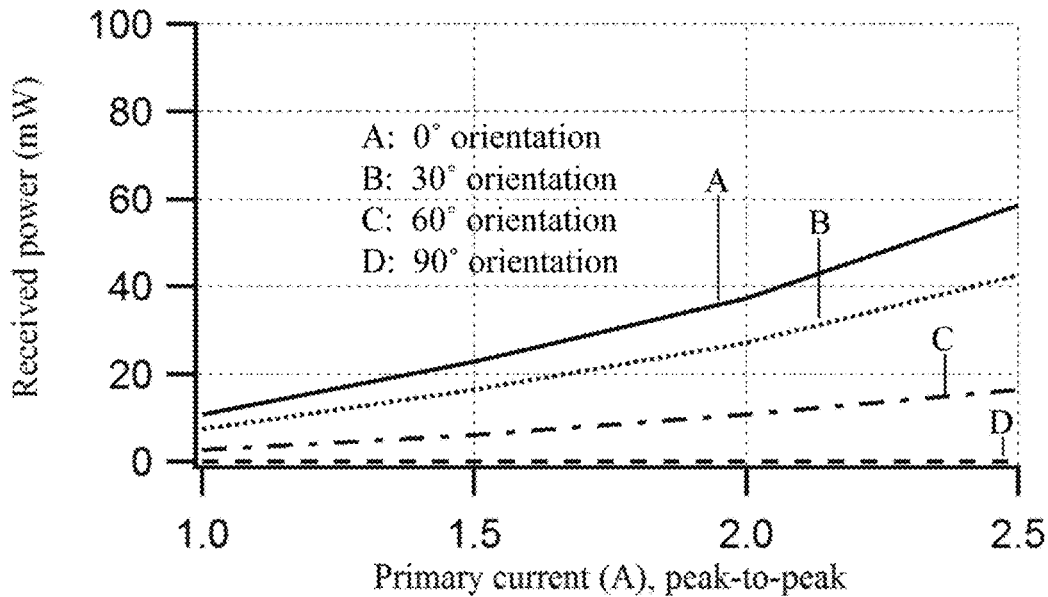
FIG. 13 is a graph of received power (mW) as a function of primary current (A) illustrating the power received in the air-core configuration at the middle of the cage, with a 5 KΩ load $R_L$, for several orientations of the air-core configuration.

FIG. 13 shows a plot of the power transferred to the air-core configuration, when it is located at the middle of the primary cage. The air-core uses a $R_L$ value of 5 kΩ, to achieve impedance matching within the device itself. The induced voltage $V_{ind}$ is measured across $R_L$ by the WMS, and the values are recorded in Table IV. Those $V_{ind}$ values together with $R_L$ are used to create the received power plot of FIG. 13. The maximum power received is 58.4 mW, which occurs at a 0° orientation, with an applied primary coil current ($I_p$) of 2.5 A.

The results of the air-core configuration are expected. As the applied primary current increases, $V_{ind}$ increases, leading to higher power transfer. As the orientation of the secondary increases beyond 0°, coupling is reduced, leading to lower $V_{ind}$, which becomes very small when θ≈90°. The power transfer could be further increased, by increasing the primary coil current, $I_p$, until the ferrites become saturated. This is possible as long as the DC power supply has sufficient power, the parameter VDS (FIG. 10) stays within its breakdown voltage, and the primary coil voltage and current are safe.

Figure 14:
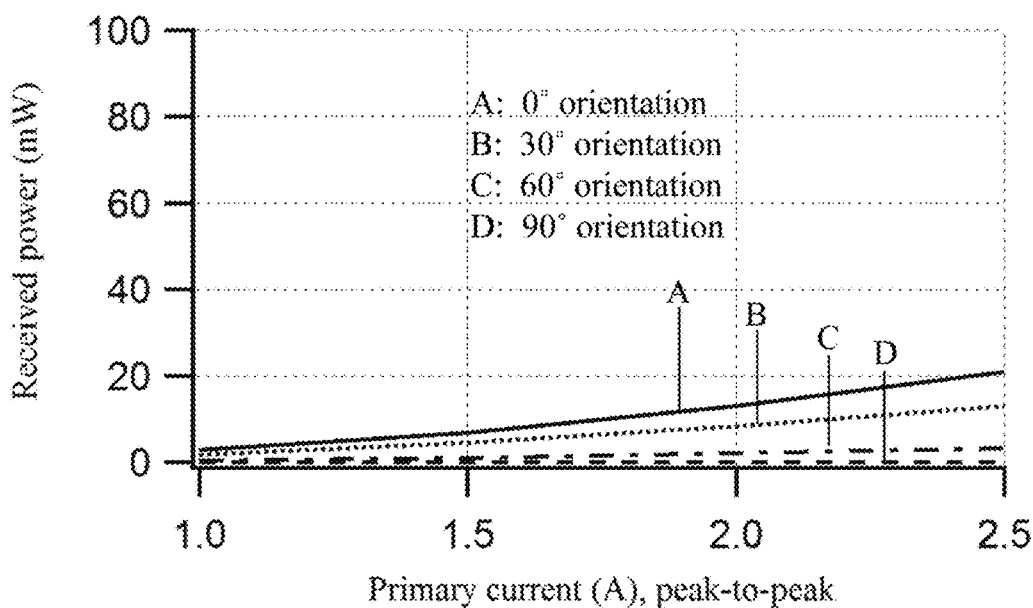
FIG. 14 is a graph of received power (mW) as a function of primary current (A) illustrating the power received in the WFR$_4$ configuration at the middle of the cage, with a 5 KΩ load $R_L$ for several orientations of the WFR$_4$ configuration.

FIG. 14 shows a plot of the power transferred to the WFR$_4$ configuration at the middle of the primary cage. WFR$_4$ uses a $R_L$ value of 5 kΩ to achieve impedance matching within the device. $V_{ind}$ is measured across $R_L$, and is recorded in Table IV. The maximum power received is 20.8 mW, which occurs at the 0° orientation with a primary coil current ($I_p$) of 2.5 A.

Figure 11A:
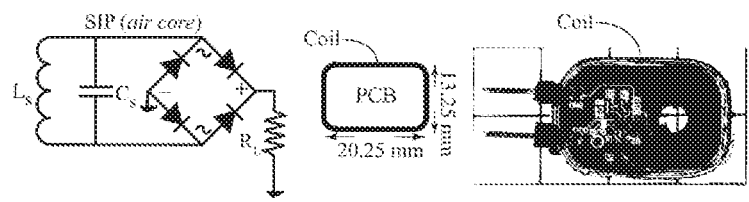
FIGS. 11A-11D are device configurations of an air-core (FIG. 11A), WFR$_4$ (FIG. 11B), 4MF (FIG. 11C), and 4MFA (FIG. 11D) where $L_s$ represents the secondary coil and $C_s$ represents the tank capacitor, in all figures.
Figure 11B:
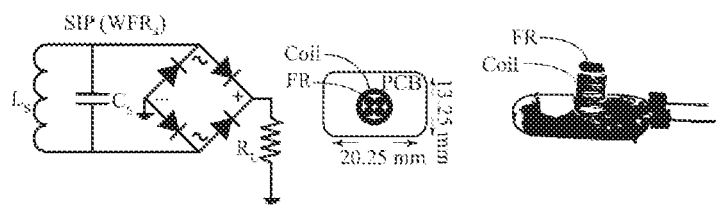
Figure 11C:
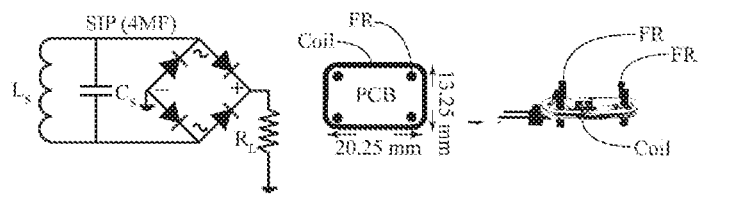
Figure 15:
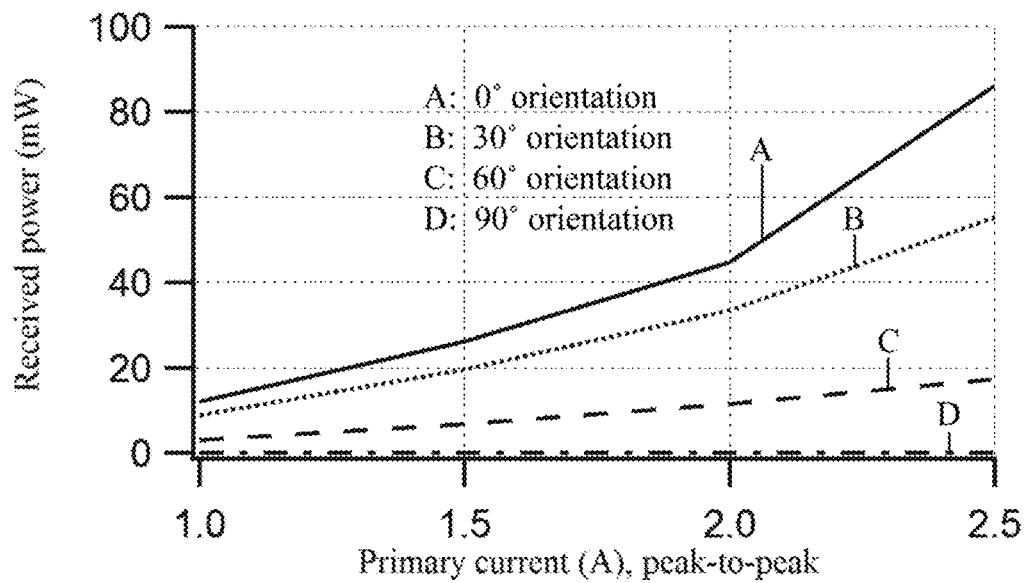
FIG. 15 is a graph of received power (mW) as a function of primary current (A) illustrating the power received in the 4MF configuration at the middle of the cage, with a 10 KΩ load $R_L$ for several orientations of the 4MF configuration.

FIG. 15 shows a plot of the power transferred to the 4MF configuration at the middle of the primary cage. The 4MF configuration uses a $R_L$ value of 10 kΩ to achieve impedance matching within the device. $V_{ind}$ is measured across $R_L$, and is recorded in Table IV. The maximum power received is 86 mW, which occurs at the 0° orientation, with a primary coil current ($I_p$) of 2.5 A. The 4MF configuration differs from the air-core due to the four ferrite components placed perpendicular to the PCB, as shown in FIG. 11C. Recall that the FEA simulations predict that 4MF picks up more flux at all orientations, compared to the air-core. The results confirm an increase in the received power at all orientation. However, in some embodiments, the 4MF configuration is not effective at the 90° orientation, where the received power is only 1 mW.

Figure 11D:
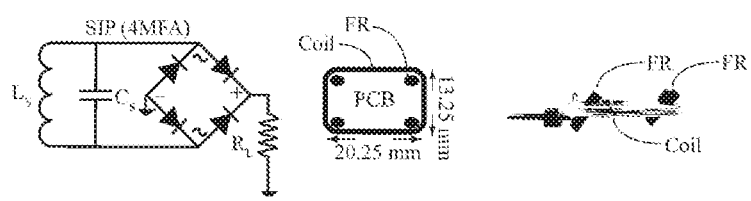
Figure 16:
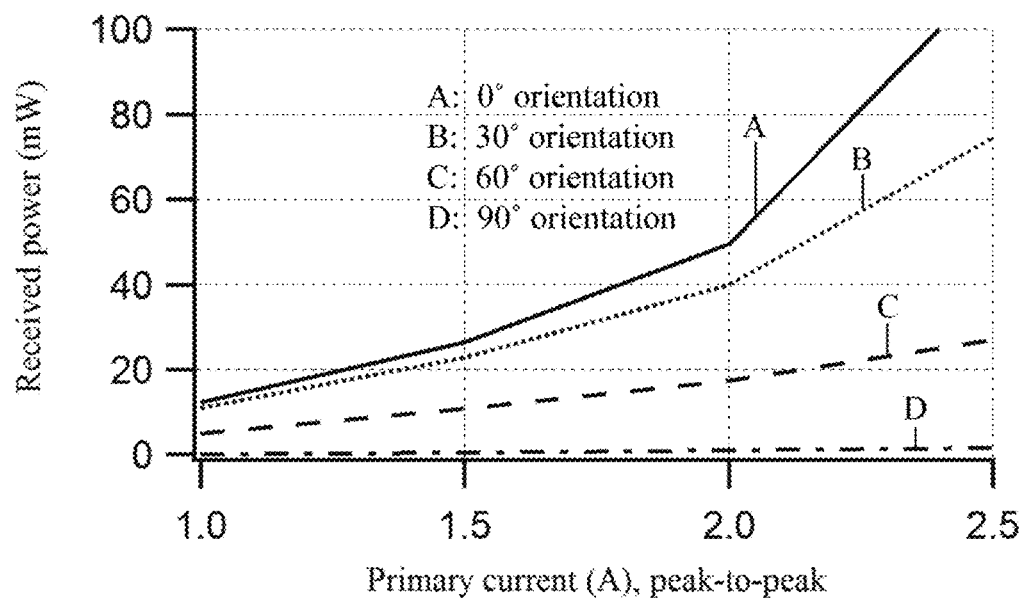
FIG. 16 is a graph of received power (mW) as a function of primary current (A) illustrating the power received in the 4MFA configuration at the middle of the cage, with a 10 KΩ load $R_L$ for several orientations of the 4MFA configuration.

FIG. 16 shows a plot of the power transferred to the 4MFA configuration at the middle of the primary cage. The 4MFA configuration uses a $R_L$ value of 10 kΩ to achieve impedance matching within the device. $V_{ind}$ is measured across $R_L$, and is recorded in Table IV. The maximum power received is 113 mW, which occurs at the 0° orientation, with a primary coil current ($I_p$) of 2.5 A. 4MFA has tilted (45°) ferrite components located at the edges of the PCB, as shown in FIG. 11D. It can be seen that the power collected by 4MFA is higher than the 4MF configuration at all orientations, yet it uses the same size secondary coil with similar L and Q properties as listed in Table II, and the same size and volume of ferrites. The angularity of the ferrite components at 45° demonstrates an improvement in coupling. Even at the 90° orientation, the power received by 4MFA is 1.7 mW (with $I_p$ of 2.5 A), where all other configurations collected near zero power. The FEA simulation results predict that 4MFA would have a flatter spread of collected flux at the 0°, 30°, and 60° orientations, as shown in Table I. This flatter trend can be observed in the $V_{ind}$ data of Table IV, at these orientations.

TABLE IV

Induced voltage $V_{ind}$ measured on the device across load $R_L$

| Configuration | 1.0 A primary current (V) | 1.5 A primary current (V) | 2.0 A primary current (V) | 2.5 A primary current (V) |
|---|---|---|---|---|
| Air-core, 0° | 7.3 | 10.6 | 13 | 17.1 |
| Air-core, 30° | 6 | 9 | 11.6 | 14.6 |
| Air-core, 60° | 3.7 | 5.5 | 7.3 | 9.1 |
| Air-core, 90° | 0 | 0 | 0 | 0.14 |
| 4MF, 0° | 10.9 | 16.2 | 21.1 | 29.3 |
| 4MF, 30° | 9.4 | 13.9 | 18.3 | 23.5 |
| 4MF, 60° | 5.6 | 8.2 | 10.7 | 13.1 |
| 4MF, 90° | 0 | 0 | 0.14 | 0.32 |
| 4MFA, 0° | 11.1 | 16.3 | 22.2 | 33.6 |
| 4MFA, 30° | 10.5 | 15.1 | 19.9 | 27.3 |
| 4MFA, 60° | 7.1 | 10.4 | 13.2 | 16.2 |
| 4MFA, 90° | 1.2 | 2.3 | 3.3 | 4.1 |
| WFR$_4$, 0° | 3.7 | 5.8 | 8.1 | 10.2 |
| WFR$_4$, 30° | 2.9 | 4.7 | 6.4 | 8.1 |
| WFR$_4$, 60° | 1.2 | 2.1 | 3.2 | 4 |
| WFR$_4$, 90° | 0 | 0 | 0 | 0.26 |

Improvements in wireless power transfer between the primary and secondary coils have been observed, when using a small volume of ferrite components within the secondary coil, at specific locations. This can be seen in the simulation results of Table I, and also the experimental results of Table IV and FIGS. 13-16.

The 4MF configuration shows a clear improvement in power transfer as compared to the air-core configuration, as expected. The ability of the air-core coil to harvest magnetic flux is directly proportional to the coil area through which the primary field passes, which defines the induced voltage $V_{ind}$ in the secondary. Addition of ferrites draws more flux into the coil, resulting in improved coupling and hence power transfer.

Given that both the 4MF and WFR$_4$ configurations use the same volume of ferrite material, and have similar coil properties (L and Q), it is noteworthy to observe that 4MF is far more effective at power transfer than WFR$_4$ at all orientations. The conventional practice in the literature is to tightly wrap the windings around the ferrite for most WPT applications, as is done with WFR$_4$; however, the 4MF configuration is more effective for WPT. This difference may be because of any one or more of the following reasons.

First, the coil winding area of 4MF is larger at 13.25×20.15 mm² than WFR₄, so extra ambient flux can be captured, as listed in Table I. Second, the ferrite components have an effective capture diameter (ECD). Since they are placed close to the corners of the 4MF coil windings, this allows them to pull magnetic flux into the coil from further beyond the coil. This effectively increases the coil area to a much larger size. The ECD is estimated as about 9 mm in certain embodiments, but can vary for different shapes and properties of ferrite, as well as primary field strength. The ECD size can be visualized with the FEA simulations, as shown in FIG. 6A. In some embodiments, four ferrites were used since their ECD areas overlap inside the coil, and hence the four ferrites consume most of the internal field. In particular embodiments, adding more ferrite components within 4MF yields very little additional gain. Third, corner placement of the ferrite components can be used and can exhibit superior performance as compared to that obtained when they are placed in the center of the secondary coil. The distance between the ferrite components themselves is governed by the ECD. If two ferrite components are placed too close together, such as for WFR₄, they will compete for the same flux, and hence will reduce their effectiveness. This only holds true as long as the ferrites are not saturated. If the ferrites become saturated, they can be placed closer together. Fourth, the length of the ferrite components (in addition to corner placement) also plays an important factor for collecting flux at orientations beyond 0°, such as between 0° and 90°. The maximum length of the ferrite components becomes a design compromise between the device total volume and power transfer. However, though 4MF is more effective at power transfer than WFR₄, both are not effective at orientations that approach 90°.

To improve the performance of the 4MF configuration at high orientations, the 4MFA configuration was created by tilting the ferrites at 45° with respect to the axis of the secondary coil. It is observed that 4MFA will increase the power transfer in comparison to 4MF at all angular orientations. The motivation to tilt the ferrites was to allow them to draw flux through the secondary coil, even when the secondary coil is oriented at 90° to the primary magnetic field. This can be observed in the simulation of FIG. 7D. Further, Table IV and FIG. 16 show that 4MFA is the most effective for WPT at any orientation, in comparison to all other configurations.

The complete WPT system can be characterized in terms of end-to-end efficiency, from the DC supply source to the device application load $R_L$ ($\eta_{DC\text{-}Load}$). This can be calculated as indicated below.

$$\eta_{DC\text{-}Load} = \frac{P_{Load}}{P_{DC}} \quad (13)$$

With reference to Equation (13), $P_{DC}$ is the total DC input power to the system (i.e., into the power amplifier and transfer link) and $P_{Load}$ is the real power dissipated in the load $R_L$. Table V summarizes the efficiency of the air-core, WFR₄, 4MF and 4MFA configurations. It is found that the efficiency of the power transfer depends on the coupling coefficient between the coils and their quality factors. The coupling coefficient essentially depends on the relative size of the primary and secondary coils, and their spatial arrangement. Also, the efficiency increases with increased primary current.

TABLE V total efficiency ($\eta_{DC\text{-}Load}$)

| Configuration | 1.0 A primary current (%) | 1.5 A primary current (%) | 2.0 A primary current (%) | 2.5 A primary current (%) |
|---|---|---|---|---|
| Air-core, 0° | 0.38 | 0.52 | 0.63 | 0.77 |
| Air-core, 30° | 0.17 | 0.37 | 0.46 | 0.56 |
| Air-core, 60° | 0.04 | 0.10 | 0.18 | 0.22 |
| Air-core, 90° | 0 | 0 | 0 | 0 |
| 4MF, 0° | 0.42 | 0.6 | 0.76 | 1.13 |
| 4MF, 30° | 0.31 | 0.45 | 0.57 | 0.73 |
| 4MF, 60° | 0.11 | 0.15 | 0.19 | 0.23 |
| 4MF, 90° | 0 | 0 | 0 | 0 |
| 4MFA, 0° | 0.44 | 0.61 | 0.84 | 1.5 |
| 4MFA, 30° | 0.39 | 0.52 | 0.68 | 0.98 |
| 4MFA, 60° | 0.18 | 0.25 | 0.3 | 0.36 |
| 4MFA, 90° | 0 | 0.01 | 0.018 | 0.02 |
| WFR₄, 0° | 0.1 | 0.15 | 0.22 | 0.27 |
| WFR₄, 30° | 0.06 | 0.10 | 0.13 | 0.17 |
| WFR₄, 60° | 0.1 | 0.02 | 0.03 | 0.04 |
| WFR₄, 90° | 0 | 0 | 0 | 0 |

Some comparisons can be made between the simulation results and the experimental results, in relation to induced voltage improvements from the addition of ferrite components. Note that the simulation results are non-resonant, while the experimental results are resonant, hence, only comparisons of normalized trends can be made. Table VI shows the total flux $\psi_{SP}$ calculated from the simulation results (from Table I), and the induced voltage $V_{ind}$ measured from experiment (from Table IV). Also included is the normalized percent variation (NPV), defined as: $\psi_{SP}/(\psi_{SP}$ at 0°), and $V_{ind}/(V_{ind}$ at 0°) for simulation and experiment, respectively. For WPT, $V_{ind}$ is directly proportional to the total flux $\psi_{SP}$ passing through the secondary, so normalized comparisons can be made. For the air-core configuration and the WFR₄ configuration, it can be seen that the NPV for the simulation matches the NPV obtained in certain embodiments quite well. For the 4MF configuration, the NPV for simulation and experiment are relatively close, however, discrepancies are observed for the 30° and 60° orientations. For the 4MFA configuration, there are significant differences in NPV between simulation and experiment. The simulation predicts that the angled ferrites should create a flatter induced voltage between the 0°-60° orientations, with a notable increase at 90°. However, results disclosed herein show a more gradual variation in $V_{ind}$ across the orientations, also with a reasonable improvement at 90°.

TABLE VI

Comparison between simulation results and experimental results.

| | Simulation | | Experiment | |
|---|---|---|---|---|
| Configuration | Total Flux $\psi_{SP}$ through the Coil (Wb) × 10⁻⁸ | Normalized Percent Variation (%) | Induced Voltage in Secondary ($V_{ind}$) | Normalized Percent Variation (%) |
| Air-core, 0° | 2.95 | 100 | 17.1 | 100 |
| Air-core, 30° | 2.56 | 87 | 14.6 | 85 |
| Air-core, 60° | 1.48 | 50 | 9.1 | 53 |
| Air-core, 90° | 0 | 0 | 0.14 | 1 |
| 4MF, 0° | 4.14 | 100 | 29.3 | 100 |
| 4MF, 30° | 3.61 | 87 | 23.5 | 80 |
| 4MF, 60° | 2.17 | 53 | 13.1 | 45 |
| 4MF, 90° | 0 | 0 | 0.32 | 1 |
| 4MFA, 0° | 3.46 | 100 | 33.6 | 100 |
| 4MFA, 30° | 3.33 | 96 | 27.3 | 81 |

TABLE VI-continued

Comparison between simulation results and experimental results.

| | Simulation | | Experiment | |
|---|---|---|---|---|
| Configuration | Total Flux $\psi_{SP}$ through the Coil (Wb) × $10^{-8}$ | Normalized Percent Variation (%) | Induced Voltage in Secondary ($V_{ind}$) | Normalized Percent Variation (%) |
| 4MFA, 60° | 2.64 | 76 | 16.2 | 48 |
| 4MFA, 90° | 0.85 | 25 | 4.1 | 12 |
| WFR$_4$, 0° | 0.89 | 100 | 10.2 | 100 |
| WFR$_4$, 30° | 0.72 | 82 | 8.1 | 79 |
| WFR$_4$, 60° | 0.40 | 45 | 4 | 39 |
| WFR$_4$, 90° | 0 | 0 | 0.26 | 2.5 |

The devices disclosed herein can be used as a stimulator and EEG measurement device for small rodents, as shown in FIG. 17. In such an application, the power needed to start up the circuit is 51 mW for a 100-300 milliseconds. After startup, the system can run indefinitely with a power of at least 12 mW. Given the results disclosed herein, the 4MFA configuration is best suited for the stimulator/EEG application to deliver power at typical orientations and positions of the rodent within the animal cage. Although, in some embodiments, the 4MFA does not deliver maximum power at the 90° orientation, the rodent rarely stands in such a pose with the device at this angle, for more than 1 second. To cope with the reduced power, a capacitor bank ($C_{st}$ of 800 µF) can be used to store energy, where the storage period is given by Equation (14) below.

$$\Delta t = \frac{\Delta V \times C}{I_{L \, SIP \, of \, 4MFA}} = \frac{(9.27-3) \times 800 \times 10^{-6}}{4 \times 10^{-3}} = 1.3 \text{ seconds} \quad (14)$$

The devices and systems disclosed herein are suitable for transmitting power to a telemetric device located on a freely moving rodent. Since the rodent orientation is variable, the coupling between the primary and secondary coils varies with the orientation between them. Methods to improve coupling at various orientations has been investigated, using ferrite components placed within the secondary coil. FEA simulation is done to find the magnetic flux density distribution around various secondary configurations, to predict the best arrangements of ferrites within the secondary coil. Four exemplary configurations are disclosed and tested to determine the power transfer performance. The 4MF configuration shows a clear improvement in power transfer as compared to WFR$_4$, even though both configurations have similar coil properties, and use the same volume of ferrite components. By tilting the ferrite components of 4MF to create the 4MFA configuration, it is shown that 4MFA will increase power transfer in comparison to all other configurations, at all angular orientations. The 4MFA configuration was shown to provide up to 113 mW of power when oriented at 0° to the primary field, with a WPT efficiency of 1.5%. Since the simulation results are non-resonant, while the experimental results are resonant, only comparisons of normalized trends between the simulation and experiment were made. The devices and systems disclosed herein may also be used to provide power to other small portable electronic devices that are in the category of loosely coupled WPT. For any WPT system, some form of application circuit will reside on a PCB to perform a function. Such a PCB and on-board electronics, may be a relatively large part of the system. In such a case, the device embodiments disclosed herein allow for plenty of volume within the secondary coil winding for application circuits. The winding can be wrapped around the perimeter of the PCB, with four ferrites to be placed in the corners inside the coil. This is in contrast to traditional approaches to tightly wrap the secondary coil around a solid ferrite. By using this approach, minimal addition of ferrite at carefully placed locations, can provide significant improvements in power transfer at most orientations, while leaving plenty of volume for application circuits. Also disclosed herein are method embodiments comprising generating an alternating electrical current in a primary coil so as to induce an alternating current in a secondary coil, the secondary coil having a secondary axis, wherein at least one ferrite rod is within a volume defined by the secondary coil; and coupling the alternating current induced in the secondary coil to a rectifier so as to produce a rectified electrical current. In some embodiments, the rectified electrical current is filtered with a capacitor.

IV. Additional Embodiments

Additional cage winding geometries can be used and elucidated using COMSOL simulation tools so as to visualize the electromagnetic flux distribution within the primary coil. Some of these geometries were then constructed and tested, which demonstrated superior quality-factors Q of the primary coil. This in turn leads to increases in system efficiency. The primary coil is a gradual spiral winding around a rectangular prismatic shape. In some embodiments, a separation distance of 0.5 cm between successive windings is selected, as illustrated in FIG. 18. In some embodiments, the separation distance of the windings was 1.5 cm, which can exhibit a lower value for Q.

Also described are different topologies of circuit configuration between a primary coil (transmitter coil, or Tx) and a secondary coil (receive coil, or Rx). In some embodiments, there are four topologies for achieving magnetic resonant coupling between the primary and secondary coils. The topologies are SS, SP, PP, and PS for WPT systems, where the first S or P stands for series or parallel compensation of the primary coil, and the second S or P stands for series or parallel compensation of the secondary coil. In some embodiments, the topology illustrated in FIG. 2A can be used. In yet other embodiments, a different power amplifier (using the primary winding of FIG. 18) can be used, which is referred to herein as the "S" topology. The WPT system was first simulated using SS and SP topologies mathematically to simulate the effect of the magnetic resonant coupling of the loosely coupled WPT system. FIGS. 19A and 19B show the new SS and SP topologies, which were then constructed and tested. The "SP" topology worked well for the WPT system, which has shown remarkable improvements in efficiency. It seems to be a good choice for cases of loosely coupled WPT, which can be the case with rodents. Such SP and SS topologies can contribute to improved power transfer efficiency of the systems disclosed herein.

The uniformity of the electromagnetic field within the volume of the primary coil is fairly good. Uniformity of field is one aspect to control in this application, since as the rodent moves from place to place within the coil, variations in received power (due to non-uniformity of the primary field strength) should be kept to a minimum. The new primary coil (FIG. 18) was simulated using COMSOL finite element analysis software. It was observed that the magnetic flux density (in units of Wb) at the center and at the edge of the cage. The magnetic flux density at the center of the cage was found to be $1.5 \times 10^{-4}$ Wb and $9 \times 10^{-4}$ Wb at the edge of the cage, which is very similar (6 times difference) in comparison to other systems. In the z-direction (vertical) the field strengths are also very similar (2-3 times) from top to bottom. Furthermore, the direction of the field is uniformly vertical throughout the volume of the primary coil. This aspect of the system can be used in combination with the other embodiments disclosed herein. Note, in many other "plate or platform" based WPT systems, where those groups use a planar coil (spiral coil in one plane), they have very high fields at the center of their plate, which become much lower toward the edges of their coil (a reverse of our situation). Furthermore, their field also drops off significantly as the height is increased above the plate/platform. This does not occur in the described embodiments.

Figure 20:
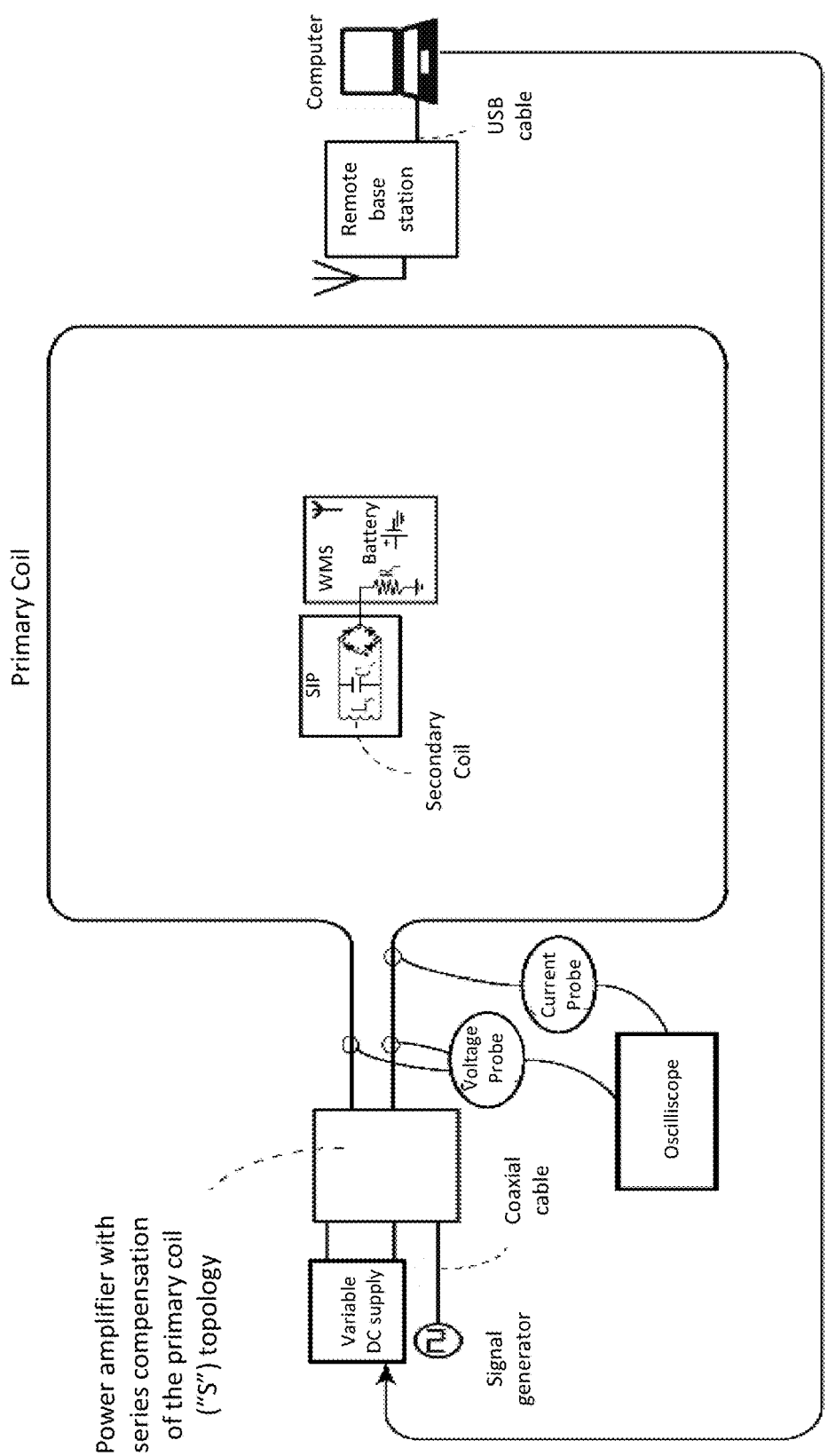
FIG. 20 is a diagram illustrating a representative WPT system.
Figure 21:
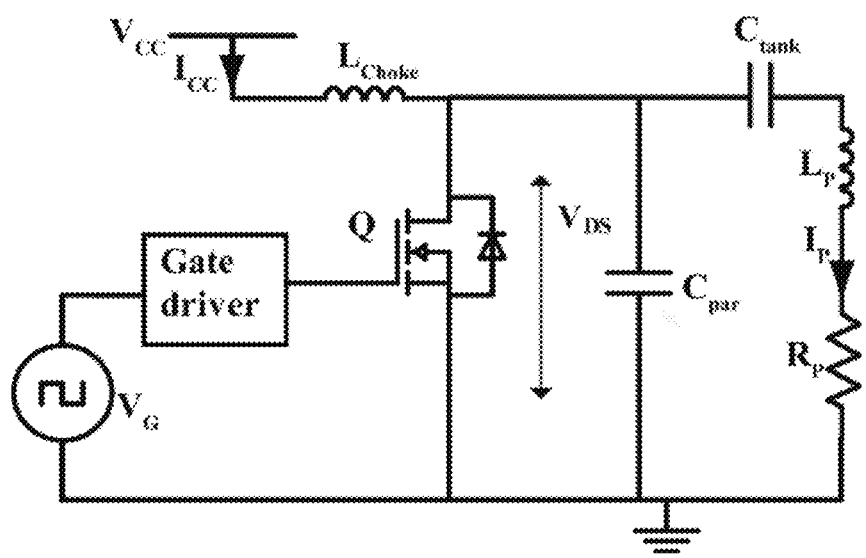
FIG. 21 is a circuit diagram illustrating an embodiment of a Class-E power amplifier design, with an S (series) resonant topology of the primary coil to the primary tank capacitor.

FIG. 20 shows the experimental setup of an additional embodiment of the WPT, and FIG. 21 shows the schematic of an additional power amplifier (series compensation, i.e., "S" of the primary coil). When performing this example, an application load, $R_L$ (as shown in FIGS. 19A and 19B) is used, which has a matched impedance value was used. The induced voltage, the received power, and the power transfer total efficiency ($\eta_{DC\text{-}Load}$) was measured for the air-core configuration. The induced voltage, the received power, and the power transfer total efficiency ($\eta_{DC\text{-}Load}$) was measured for the air-core configuration. The air-core device was placed in the 0° orientation, at the center of the primary coil, and also at the internal edge of the primary coil. A current of 2 A (peak-to-peak) was applied to the primary coil by the power amplifier (as shown in FIG. 21). The induced voltage, the received power and the total efficiency of the air-core configuration at 0° orientation at the center of the cage were: 12.6 V, 32 mW and 2.5%, respectively. The induced voltage, the received power and the total efficiency of the air-core (secondary circuit) at 0° orientation at the edge of the cage were: 18 V, 60 mW and 4.7%, respectively (without ferrites). In embodiments where ferrites are added the power transfer and total efficiencies become higher.

In some embodiments, as the mouse/rodent moves around inside the volume of the primary coil, there are differences in field strength. These differences translate to different amounts of received power on the secondary coil (implant). Furthermore, as the mouse/rodent orients their body at different angles with respect to the primary field (which is basically vertical) the amount of received power on the secondary coil (implant) will vary. Because there is a minimum power needed to keep the implant electronics going, it should receive enough power at the worst-case location in the coil, at a worse case orientation (e.g., 45 degrees). However, when the mouse/rodent goes into a more favorable location and/or orientation, it picks up an excess of power. When this excess power was received in other embodiments, on-board electronics were used to either dissipate the power or clip the voltage, both of which result in generation of heat. On a non-encapsulated device for test, this heat is easily dissipated in air. However, when the device is encapsulated for use in implantation (e.g., with silicone, epoxy, or other encapsulation materials), this excess heat typically cannot be easily dissipated due to the insulative properties of the encapsulating material. Hence the implant components may overheat or encapsulation material can be damaged causing leakage and implant failure. In some embodiments, the following approach can be used. In some embodiments, the implant has an MCU (microcontroller that is measuring the induced voltage at the secondary coil) as well as an onboard radio; thus, one can constantly monitor the level of received power on the implant. At the receiver station (shown as base station in FIG. 20), telemetry information from the implant can be received, one of which is the received power. The information can be collected and processed in the computer, and forwarded to a PID (proportional integral derivative) controller, which regulates the DC voltage of the power supply (FIG. 20). In this way, the DC voltage that feeds the amplifier can be adjusted as needed and hence the amplitude (intensity) of the magnetic field strength inside the primary coil can be regulated. This evens out the received power in the implant, and prevents overheating/burnout of the implant. This embodiment of controlling overheating can be used in combination with any of the device embodiments disclosed herein.

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim as our invention all that comes within the scope and spirit of the appended claims.

We claim:

1. A device, comprising:
   a coil defining a coil axis;
   a tank capacitor;
   at least two ferrite rods having rod axes and situated to be at least partially within a volume defined by the coil; and
   a rectifier coupled to the coil so as to receive an electrical voltage induced in the coil.

2. The device of claim 1, wherein the at least two ferrite rods four ferrite rods situated to be at least partially within a volume defined by the coil.

3. The device of claim 2, wherein the axes of the four ferrite rods have similar angles with respect to the coil axis.

4. The device of claim 1, wherein the rod axes of the at least two-ferrite rods are at angles of about 0° to about 85° relative to the axis of the coil.

5. The device of claim 1, wherein the rod axes of the at least two ferrite rods are at angles of 45° relative to the axis of the coil.

6. The device of claim 1, wherein the at least two ferrite rods are situated proximal to the coil.

7. The device of claim 1, wherein the rectifier is a full-bridge rectifier, a half-bridge rectifier, or other rectifier coupled to the coil and tank capacitor to rectify the electrical voltage induced in the coil.

8. The device of claim 7, further comprising a smoothing capacitor coupled to the rectifier to receive the rectified voltage from the rectifier.

9. The device of claim 1, wherein the rectifier receives the electrical voltage induced in the coil and transmits the electrical voltage to a stimulator component.

10. The device of claim 1, wherein the rectifier receives the electrical voltage induced in the coil and transmits the electrical voltage to a microprocessor.

11. The device of claim 1, further comprising a circuit substrate and the coil is secured to the circuit substrate.

12. The device of claim 11, wherein the coil is positioned around the perimeter of the circuit substrate.

13. The device of claim 11, wherein the at least two ferrite rods are situated so as to extend through the circuit substrate.

14. The device of claim 11, wherein the at least two ferrite rods are situated so as to be substantially bisected along the rod axes by the circuit substrate.

15. The device of claim 1, wherein the coil and the at least two ferrite rods each independently have a circular, oval, elliptical, rectangular, regular or irregular polygonal shape or cross section, respectively.

16. The device of claim 1, wherein the device is an implant device or a head-mount device.

17. The device of claim 1, wherein the device is used to provide power to other small portable electronic devices that are in the category of loosely coupled wireless power transfer (WPT) devices.

18. A system, comprising:

a primary coil defining a primary coil axis;

a primary tank capacitor coupled to the primary coil;

a secondary coil defining a secondary coil axis;

a secondary tank capacitor;

at least two ferrite rods having rod axes and situated to be at least partially within a volume defined by the secondary coil; and a rectifier coupled to the secondary coil so as to receive an electrical voltage induced in the secondary coil by the primary coil.

19. The system of claim 18, further comprising a signal generator, an amplifier, a power supply, or a combination thereof coupled to the primary coil.

20. A method, comprising:

generating an alternating electrical current in a primary coil so as to induce an alternating current in a secondary coil, the secondary coil having a secondary axis, wherein at least two ferrite rods are within a volume defined by the secondary coil; and coupling the alternating current induced in the secondary coil to a rectifier so as to produce a rectified electrical current.

* * * * *